United States Patent
Fujishima et al.

(10) Patent No.: US 10,749,851 B2
(45) Date of Patent: *Aug. 18, 2020

(54) NETWORK MONITORING METHOD AND DEVICE

(71) Applicant: FUJITSU LIMITED, Kawasaki-shi, Kanagawa (JP)

(72) Inventors: Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

This patent is subject to a terminal disclaimer.

(21) Appl. No.: 15/594,926

(22) Filed: May 15, 2017

(65) Prior Publication Data

US 2018/0007026 A1    Jan. 4, 2018

(30) Foreign Application Priority Data

Jun. 30, 2016  (JP) ................ 2016-129734

(51) Int. Cl.
*H04L 29/06*   (2006.01)
*H04L 29/08*   (2006.01)

(52) U.S. Cl.
CPC ............ *H04L 63/08* (2013.01); *H04L 63/062* (2013.01); *H04L 63/0807* (2013.01); *H04L 67/025* (2013.01); *H04L 67/306* (2013.01)

(58) Field of Classification Search
CPC ... H04L 63/08; H04L 63/062; H04L 63/0807; H04L 67/025; H04L 67/306
See application file for complete search history.

(56) References Cited

U.S. PATENT DOCUMENTS 8,458,323 B1   6/2013 Baader, II et al.
8,595,058 B2  11/2013 Fordyce, III et al.
(Continued)

FOREIGN PATENT DOCUMENTS

JP   2009048545     3/2009
JP   2010130349 A   6/2010
(Continued)

OTHER PUBLICATIONS

Notice of Allowance dated Aug. 9, 2018, issued in U.S. Appl. No. 15/363,142, 18 pages.

*Primary Examiner* — Ayoub Alata
(74) *Attorney, Agent, or Firm* — Xsensus LLP

(57) ABSTRACT

A system includes at least one of first devices respectively including a first memory and a first processor, and a second device including a second memory and a second processor. The first processor is configured to extract a credential from first communication data between a terminal device and an issuing device which issues the credential to the terminal device, and store the credential and a user account of the credential in the first memory. The second processor is configured to obtain, from the first device, the user account corresponding to the credential extracted from second communication data, the second communication data corresponding to an authentication request from the terminal device to a providing device which processes a remote operation by the terminal device, and record remote operation data extracted from third communication data from the terminal device to the providing device and the user account in the second memory.

11 Claims, 39 Drawing Sheets

(56) References Cited

U.S. PATENT DOCUMENTS

| | | |
|---|---|---|
| 8,925,052 B2 | 12/2014 | Deagon |
| 9,319,407 B1 | 4/2016 | Mauer et al. |
| 9,444,830 B2 | 9/2016 | Kim et al. |
| 9,866,566 B2 * | 1/2018 | Dulkin ................ H04L 63/102 |
| 9,967,260 B1 | 5/2018 | Gabriel et al. |
| 2007/0294209 A1 * | 12/2007 | Strub .................... H04L 63/102 |
| 2007/0294399 A1 * | 12/2007 | Grossner ................ H04L 41/22 |
| | | 709/224 |
| 2008/0247320 A1 * | 10/2008 | Grah ................... H04L 41/5012 |
| | | 370/241 |
| 2010/0128298 A1 | 5/2010 | Matsugashita |
| 2011/0093327 A1 * | 4/2011 | Fordyce, III ........... G06Q 20/10 |
| | | 705/14.39 |

FOREIGN PATENT DOCUMENTS

| | | |
|---|---|---|
| JP | 2012221274 A | 11/2012 |
| JP | 2014-110046 | 6/2014 |

* cited by examiner

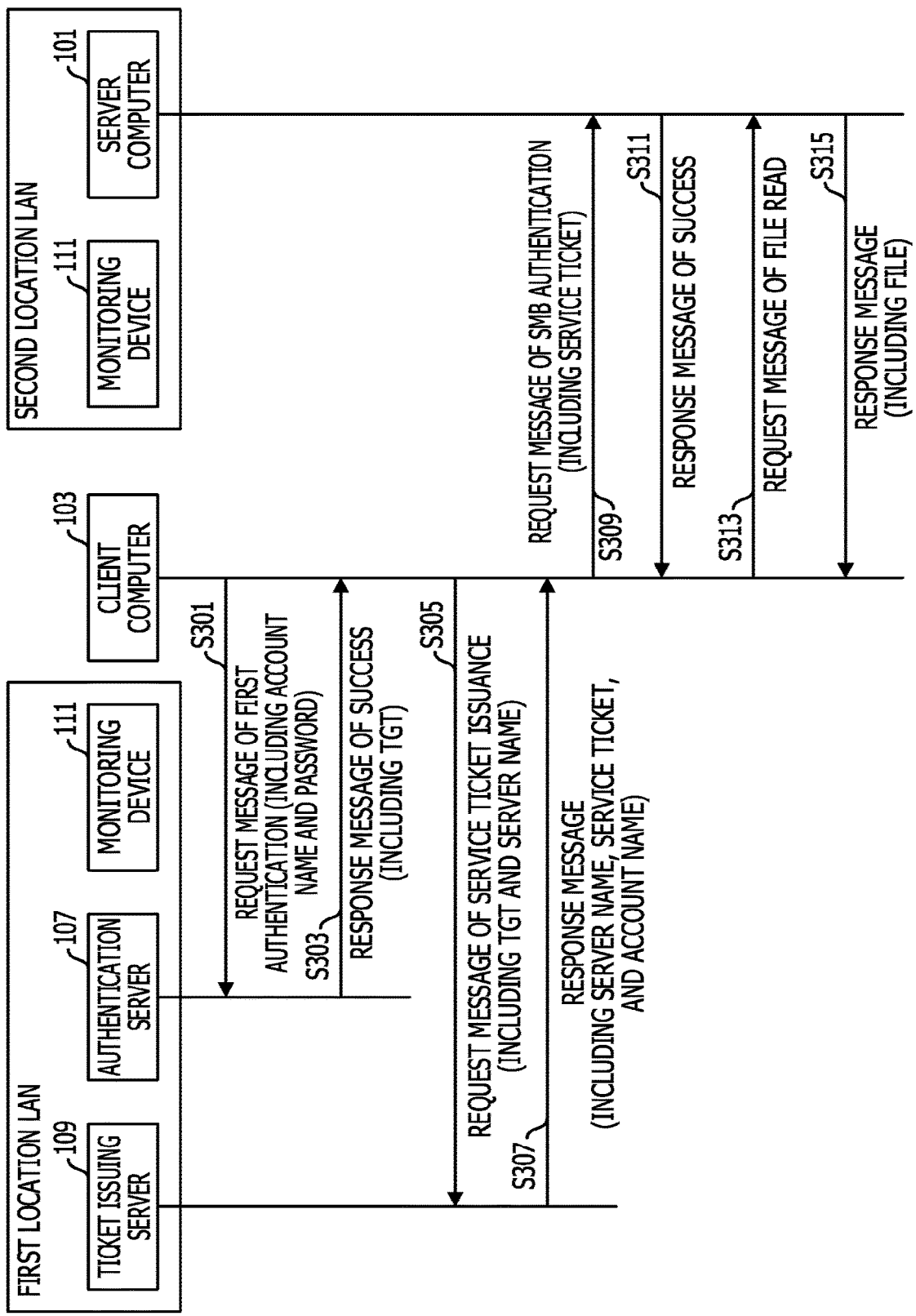

FIG. 9

| DATE AND TIME | TRANSMISSION SOURCE IP ADDRESS | TRANSMISSION SOURCE PORT NUMBER | DESTINATION IP ADDRESS | DESTINATION PORT NUMBER | CLIENT REALM NAME AND ACCOUNT NAME | SERVER REALM NAME AND SERVER NAME | SERVICE THICKET |
|---|---|---|---|---|---|---|---|
| $T_1$ | $A_{15}$ | 88 | $A_{10}$ | $P_1$ | $R_1/B_1$ | $R_2/S_1$ | xxxx… |
| … | … | … | … | … | … | … | … |

FIG. 14

| DATE AND TIME | TRANSMISSION SOURCE IP ADDRESS | TRANSMISSION SOURCE PORT NUMBER | DESTINATION IP ADDRESS | DESTINATION PORT NUMBER | CONNECTION ID | CLIENT REALM NAME AND ACCOUNT TNAME | SERVER REALM NAME AND SERVER NAME |
|---|---|---|---|---|---|---|---|
| $T_2$ | $A_{10}$ | $P_1$ | $A_{30}$ | $P_2$ | $C_1$ | $R_1/B_1$ | $R_2/S_1$ |
| ... | ... | ... | ... | ... | ... | ... | ... |

FIG. 16

| CONNECTION ID | TRANSMISSION SOURCE IP ADDRESS | TRANSMISSION SOURCE PORT NUMBER | DESTINATION IP ADDRESS | DESTINATION PORT NUMBER |
|---|---|---|---|---|
| $C_1$ | $A_{10}$ | $P_1$ | $A_{30}$ | $P_2$ |
| ⋮ | ⋮ | ⋮ | ⋮ | ⋮ |

FIG. 20

| DATE AND TIME | TRANSMISSION SOURCE IP ADDRESS | TRANSMISSION SOURCE PORT NUMBER | DESTINATION IP ADDRESS | DESTINATION PORT NUMBER | CONNECTION ID | COMMAND NAME + OPTION | ATTRIBUTE DATA | | |
|---|---|---|---|---|---|---|---|---|---|
| | | | | | | | CLIENT REALM NAME AND ACCOUNT NAME | SERVER REALM NAME AND SERVER NAME | PATH OR ACCOUNT NAME |
| $T_3$ | $A_{10}$ | $P_1$ | $A_{30}$ | $P_2$ | $C_1$ | FILE READ | $R_1/B_1$ | $R_2/S_1$ | c:\fileA |
| $T_4$ | $A_{13}$ | $P_3$ | $A_{25}$ | $P_4$ | $C_2$ | USER REGISTRATION | $R_3/B_2$ | $R_4/S_2$ | newuserA |
| ... | ... | ... | ... | ... | ... | ... | ... | ... | ... |

FIG. 26

| DATE AND TIME | REQUEST SOURCE IP ADDRESS | REQUEST SOURCE PORT NUMBER | SERVER REALM NAME AND SERVER NAME | MONITORING DEVICE IP ADDRESS | ISSUANCE LOG FILE NAME |
|---|---|---|---|---|---|
| $T_1$ | $A_{10}$ | $P_1$ | $R_2/S_1$ | $A_1$ | $F_1$ |
| ... | ... | ... | ... | ... | ... |

FIG. 29

| DATE AND TIME | ISSUANCE SOURCE IDENTIFIER | REQUEST SOURCE IP ADDRESS | REQUEST SOURCE PORT NUMBER | SERVER REALM NAME AND SERVER NAME | MONITORING DEVICE IP ADDRESS | ISSUANCE LOG FILE NAME |
|---|---|---|---|---|---|---|
| $T_1$ | $A_3$ | $A_{10}$ | $P_1$ | $R_2/S_1$ | $A_1$ | $F_1$ |
| ... | ... | ... | ... | ... | ... | ... |

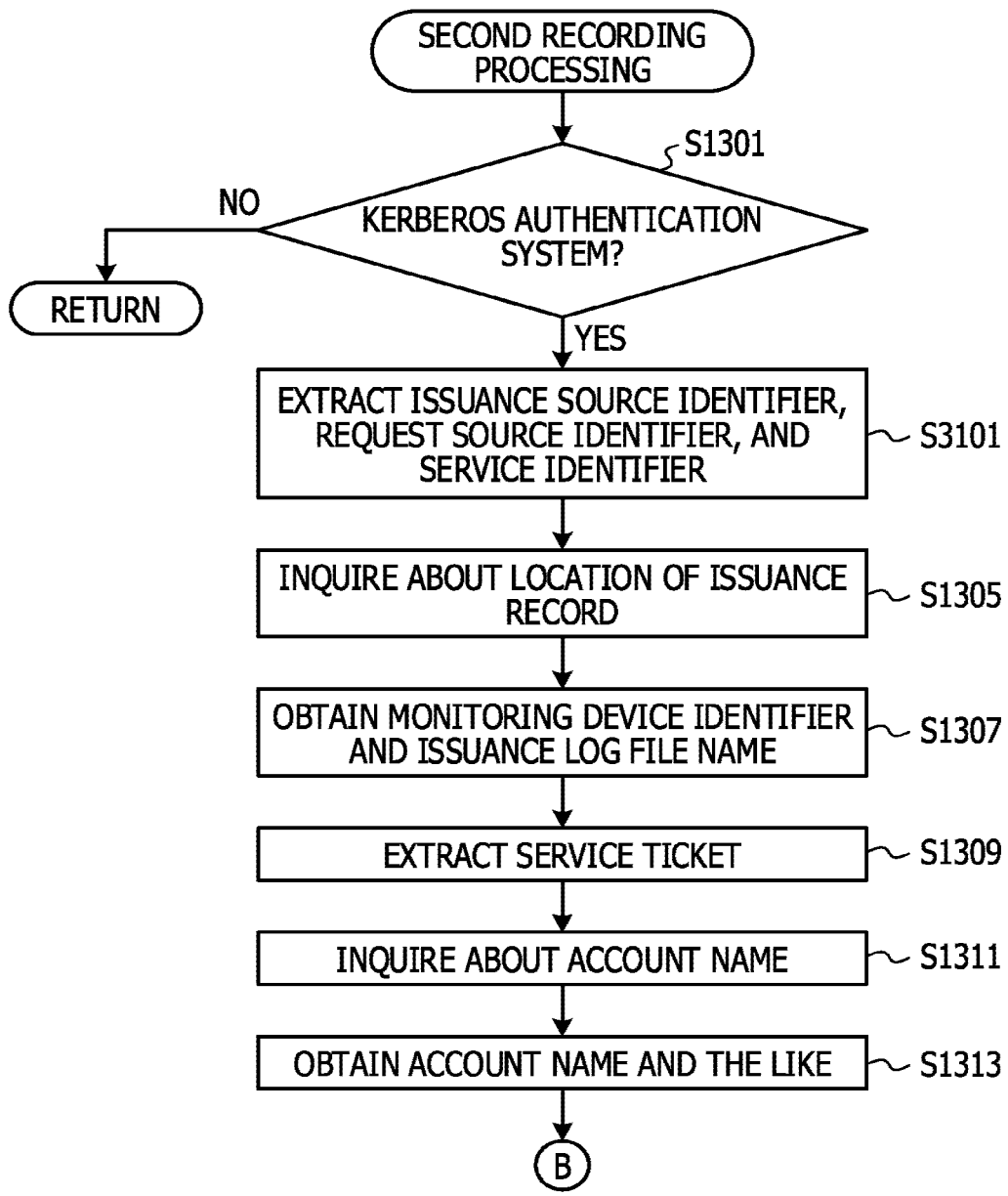

NETWORK MONITORING METHOD AND DEVICE

CROSS-REFERENCE TO RELATED APPLICATION

This application is based upon and claims the benefit of priority of the prior Japanese Patent Application No. 2016-129734, filed on Jun. 30, 2016, the entire contents of which are incorporated herein by reference.

FIELD

The embodiments discussed herein are related to a technology for logging remote operations in a network.

BACKGROUND

A server computer compliant with a remote operation protocol on a network performs user authentication using a credential, and then receives remote operation from a user. An account name and a password specified by the user, for example, correspond to the credential.

In a recent information processing system, in order to manage accounts collectively, user authentication in a server computer may be performed based on a service ticket issued from a ticket issuing system, instead of sending out an account name and a password in plain text to a network.

Related technologies are disclosed in Japanese Laid-open Patent Publication Nos. 2014-110046 and 2009-48545.

SUMMARY

According to an aspect of the embodiments, a system includes a system includes at least one of first devices respectively including a first memory and a first processor, and a second device including a second memory and a second processor. The first processor is configured to extract a credential from first communication data between a terminal device and an issuing device which issues the credential to the terminal device, and store the credential and a user account of the credential in association with each other in the first memory. The second processor is configured to obtain, from the first device, the user account corresponding to the credential extracted from second communication data, the second communication data corresponding to an authentication request from the terminal device to a providing device which processes a remote operation by the terminal device, and record remote operation data extracted from third communication data from the terminal device to the providing device in association with the user account in the second memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a sequence to be monitored;

FIG. 9 is a diagram illustrating an example of configuration of an issuance log;

FIG. 14 is a diagram illustrating an example of configuration of an authentication log;

FIG. 16 is a diagram illustrating an example of configuration of a connection table;

FIG. 20 is a diagram illustrating an example of configuration of an operation log;

FIG. 26 is a diagram illustrating an example of configuration of a location table;

FIG. 29 is a diagram illustrating an example of configuration of a location table according to the third embodiment;

FIG. 31 is a diagram illustrating a flow of second recording processing according to the third embodiment;

DESCRIPTION OF EMBODIMENTS

A user authentication in a server computer based on a service ticket issued from a ticket issuing system is performed on condition that authentication using an account name and a password is performed in advance in the ticket issuing system.

When such an information processing system comes under cyberattack, and the account name and the password are stolen and used, the attacker obtains the service ticket, and becomes able to perform unauthorized remote operation of the server computer.

In an information processing system having a plurality of locations, for example, such a cyberattack may extend over a wide area. In such a wide-area information processing system, a ticket issuing system may be provided for each location.

It is an object in one aspect of the technology disclosed in embodiments to identify a user account that performed remote operation based on a credential issued from a credential issuing device.

First Embodiment

Figure 1:
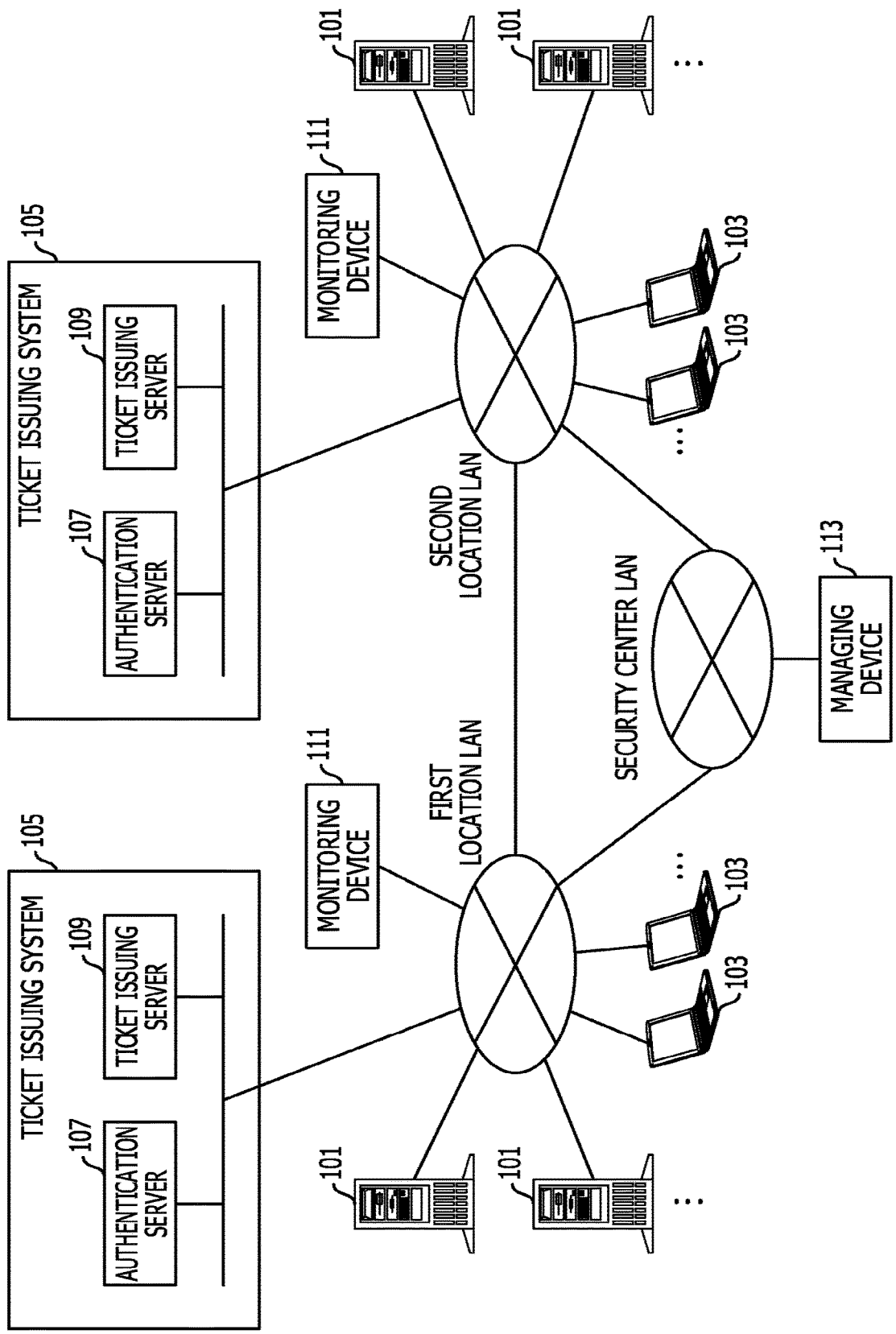
FIG. 1 is a diagram illustrating an example of a network configuration.

FIG. 1 illustrates an example of a network configuration. An information processing system in the present example includes a first location LAN and a second location LAN. The first location LAN and the second location LAN are coupled to each other by a virtual private network (VPN). Further, the first location LAN and the second location LAN are coupled to a security center LAN. A VPN coupling is established also between each of the location LANs and the security center LAN. While the two location LANs are depicted in the present example, three or more location LANs may be coupled to each other. A third location LAN and subsequent location LANs are omitted.

Each of the location LANs includes a plurality of server computers 101 and a plurality of client computers 103. An information processing system based on an intranet, for example, is assumed. Functions of the server computers 101 are arbitrary. The server computers 101 may be, for example, domain management servers, Web servers, file servers, Windows (registered trademark) servers, or the like.

Each client computer 103 may use service provided by each server computer 101. The client computer 103 may use data retained by the server computer 101. For example, suppose that the client computer 103 may perform remote operation of the server computer 101 under a given condition. For that purpose, control based on SMB is performed between the server computer 101 and the client computer 103. SMB is an example of the protocol of an application layer that provides functions of remote operations. Control based on distributed computing environment/remote procedure calls (DCE/RPC) may be further performed as the protocol of the application layer that provides functions of remote operations.

In the present embodiment, a user is authenticated by a Kerberos authentication system. Kerberos authentication is a network authentication system using common key cryptography. Kerberos authentication provides a mechanism of single sign-on that enables the user to use a plurality of services after the user goes through user authentication only once. In a sequence illustrated in the following, the server computer 101 and the client computer 103 perform mutual authentication by each decoding a ticket by an own common key, and obtaining a session key. In addition, Kerberos authentication also performs time synchronization processing for protection against masquerading and encryption processing for data concealment.

A ticket issuing system 105 collectively manages the accounts and access rights of users according to the Kerberos authentication system. The ticket issuing system 105 also retains the common keys of the server computers 101 and the common keys of the client computers 103. The ticket issuing system 105 verifies the identities of the server computers 101 and the client computers 103 based on these common keys. The ticket issuing system 105 may be referred to as a key distribution center (KDC) or a domain controller. The ticket issuing system 105 includes an authentication server 107 and a ticket issuing server 109. The authentication server 107 and the ticket issuing server 109 may be provided in an integral device.

The authentication server 107 performs user authentication in the Kerberos authentication system. The authentication server 107 may be referred to as an authentication server (AS).

The ticket issuing server 109 issues a service ticket for a client computer 103 to use a server computer 101. The service ticket includes the identification (ID) of the client computer 103, a time stamp, and an expiration date. The ticket issuing server 109 may be referred to as a ticket granting server (TGS).

The service ticket in the present embodiment is an example of a credential. The ticket issuing server 109 is also an example of a credential issuing device. In addition, the ticket issuing system 105 is an example of a credential issuing system.

Incidentally, the server computers 101 and the client computers 103 may be referred to as principals. In addition, a group of computers to which a same authentication policy is applied may be referred to as a realm. Suppose in the present example that the realm corresponds to a domain.

In addition, each location LAN includes a monitoring device 111. The monitoring device 111 is, for example, coupled to the network via a switch capable of port mirroring or a network tap. The monitoring device 111 generates a log of remote operations associated with account names by capturing packets flowing through the network and analyzing the packets. The security center LAN includes a managing device 113. The managing device 113 manages which monitoring device 111 retains given data.

Figure 2:
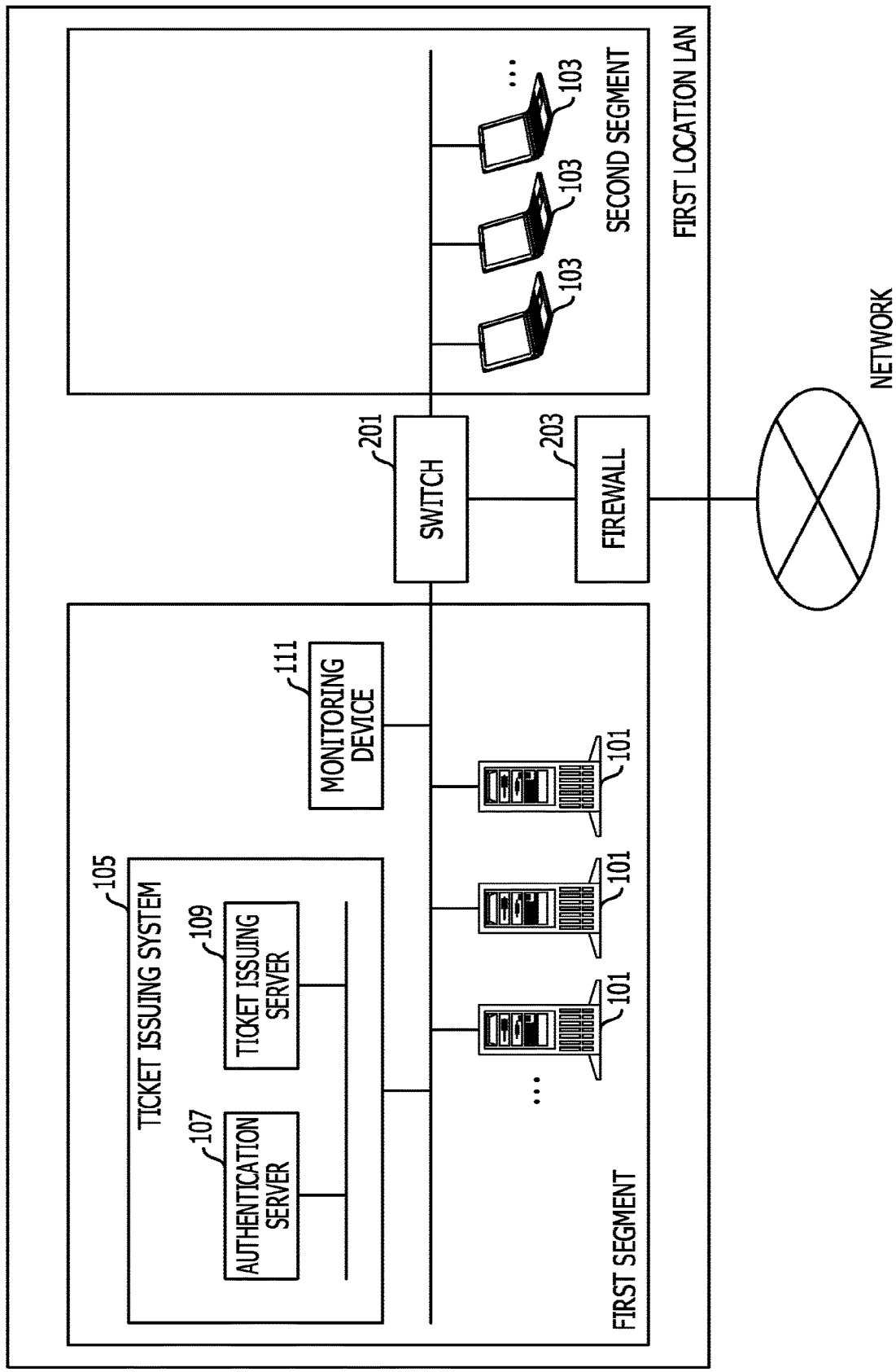
FIG. 2 is a diagram illustrating an example of a topology of a first location local area network (LAN)

The topology of a location LAN will be described. FIG. 2 illustrates an example of a topology of a first location LAN. The first location LAN is coupled to a network via a firewall 203.

The first location LAN in the present example is divided into a first segment and a second segment. The first segment and the second segment are coupled to each other via a switch 201. Each server computer 101 is included in the first segment. Each client computer 103 is included in the second segment.

The ticket issuing system 105 including the authentication server 107 and the ticket issuing server 109 is included in the first segment. The monitoring device 111 is also included in the first segment. Then, the monitoring device 111 captures packets received at the server computers 101, the authentication server 107, and the ticket issuing server 109 and packets transmitted by the server computers 101, the authentication server 107, and the ticket issuing server 109.

Incidentally, suppose that the second and subsequent location LANs also have a topology similar to that of the first location LAN.

Identifying an account as a precondition for remote operation access in such an information processing system helps hinder intelligence activities by access from malware, for example. For example, in a case where remote operation access related to intelligence activities is detected, it is possible to deal with the case by invalidating an account as a precondition for the remote operation access, or the like. Identifying the account as the precondition for the remote operation access also helps identify the extent of the server attack incurred. Monitoring in the present embodiment will be described in the following.

FIG. 3 illustrates an example of a sequence to be monitored. Suppose in the present example that a client computer 103 accesses a server computer 101 on the second location LAN, and uses the service of the server computer 101. A location LAN to which the client computer 103 in the present example belongs is arbitrary. In addition, suppose that the client computer 103 uses the ticket issuing system 105 on the first location LAN.

The client computer 103 sends a request message of user authentication (hereinafter referred to as first authentication) in the Kerberos authentication system to the authentication server 107 on the first location LAN (S301). The request message includes an account name and a password assigned to a user of the client computer 103.

The authentication server 107 on the first location LAN performs the first authentication based on the account name and the password included in the request message. When the first authentication succeeds, the authentication server 107 on the first location LAN generates a ticket-granting ticket (TGT), and sends a response message of success which response message includes the TGT to the client computer 103 (S303). The TGT is a ticket for issuing a service ticket.

The client computer 103 stores the TGT included in the response message of success. The client computer 103 sends a request message of service ticket issuance for using the server computer 101 on the second location LAN to the ticket issuing server 109 on the first location LAN (S305). The request message includes the TGT and the server name of the server computer 101 on the second location LAN.

The ticket issuing server 109 on the first location LAN verifies the TGT included in the request message of service ticket issuance. For example, the ticket issuing server 109 on the first location LAN checks a time stamp and an expiration date of the TGT, and further confirms that the user of the client computer 103 is a user having a right to access the server computer 101 on the second location LAN. When the verification succeeds, the ticket issuing server 109 on the first location LAN generates a service ticket for the user authenticated in S301 to use the server computer 101 on the second location LAN. Then, the ticket issuing server 109 on the first location LAN sends a response message including the service ticket to the client computer 103 (S307). The response message includes the account name used in the first authentication and the server name as a sending destination of the service ticket.

When the client computer 103 receives the response message, the client computer 103 sends a request message of SMB authentication to the server computer 101 on the second location LAN (S309). The request message includes the service ticket.

The server computer 101 on the second location LAN performs user authentication in SMB (which user authentication will hereinafter be referred to as SMB authentication) based on the service ticket. The SMB authentication succeeds when the service ticket is valid. When the SMB authentication succeeds, the server computer 101 on the second location LAN sends a response message of success to the client computer 103 (S311).

When the response message of success is sent, the client computer 103 is ready to perform remote operation. In the present example, the client computer 103 sends a request message of file read to the server computer 101 on the second location LAN (S313).

According to the request message, the server computer 101 on the second location LAN sends a response message including a file to the client computer 103 (S315). The file read illustrated in FIG. 3 is an example of remote operation, and another remote operation may be performed. Supposing such a sequence, the monitoring device 111 on the first location LAN and the monitoring device 111 on the second location LAN analyze packets corresponding to the above-described messages.

Figure 4A:
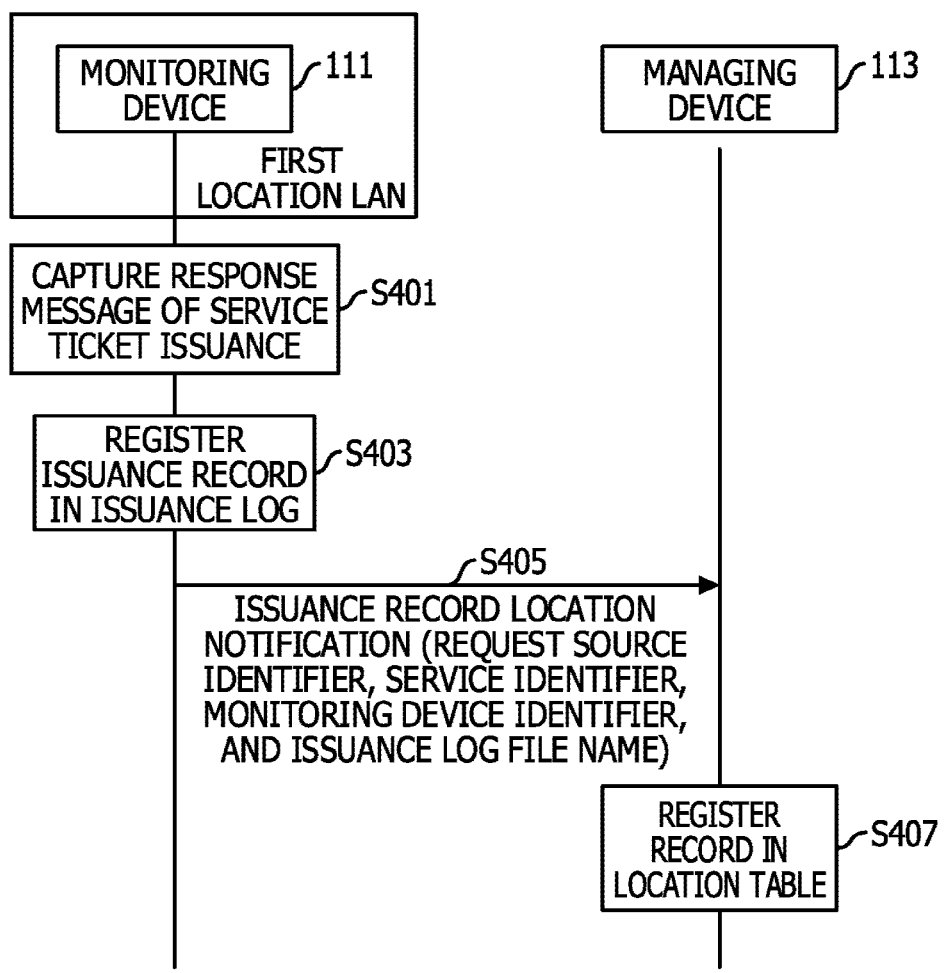
FIG. 4A is a diagram illustrating an example of a sequence of a network monitoring system.

FIG. 4A illustrates an example of a sequence of a network monitoring system. The monitoring device 111 on the first location LAN captures the response message of service ticket issuance which response message is illustrated in S307 in FIG. 3 (S401). The monitoring device 111 on the first location LAN registers an issuance record in an issuance log (S403). The issuance record is a record in the issuance log, and corresponds to the service ticket issuance. The service ticket, the account name, and the like are set in the issuance record. The issuance log will be described later with reference to FIG. 9.

The monitoring device 111 on the first location LAN next transmits an issuance record location notification to the managing device 113 (S405). The issuance record location notification includes a request source identifier, a service identifier, a monitoring device identifier, and an issuance log file name. The request source identifier is the identifier of the device that requested the service ticket from the ticket issuing server 109. The request source identifier in the present embodiment is a set of the internet protocol (IP) address of the request source and the port number of the request source. The service identifier identifies the service used based on the service ticket. The service identifier in the present embodiment is a set of a server realm name and the server name. The monitoring device identifier identifies the monitoring device 111 that retains the issuance record related to the corresponding service ticket issuance. For example, the monitoring device identifier is the identifier of the monitoring device 111 that captured and analyzed the response message of the corresponding service ticket issuance. The issuance log file name is the file name of the issuance log retained in the monitoring device 111.

When the managing device 113 receives the issuance record location notification, the managing device 113 registers a record having contents of the notification set therein in a location table (S407). The location table will be described later with reference to FIG. 26. The managing device 113 manages, in the location table, which monitoring device 111 retains the issuance record with the request source identifier and the service identifier as a key.

Figure 4B:
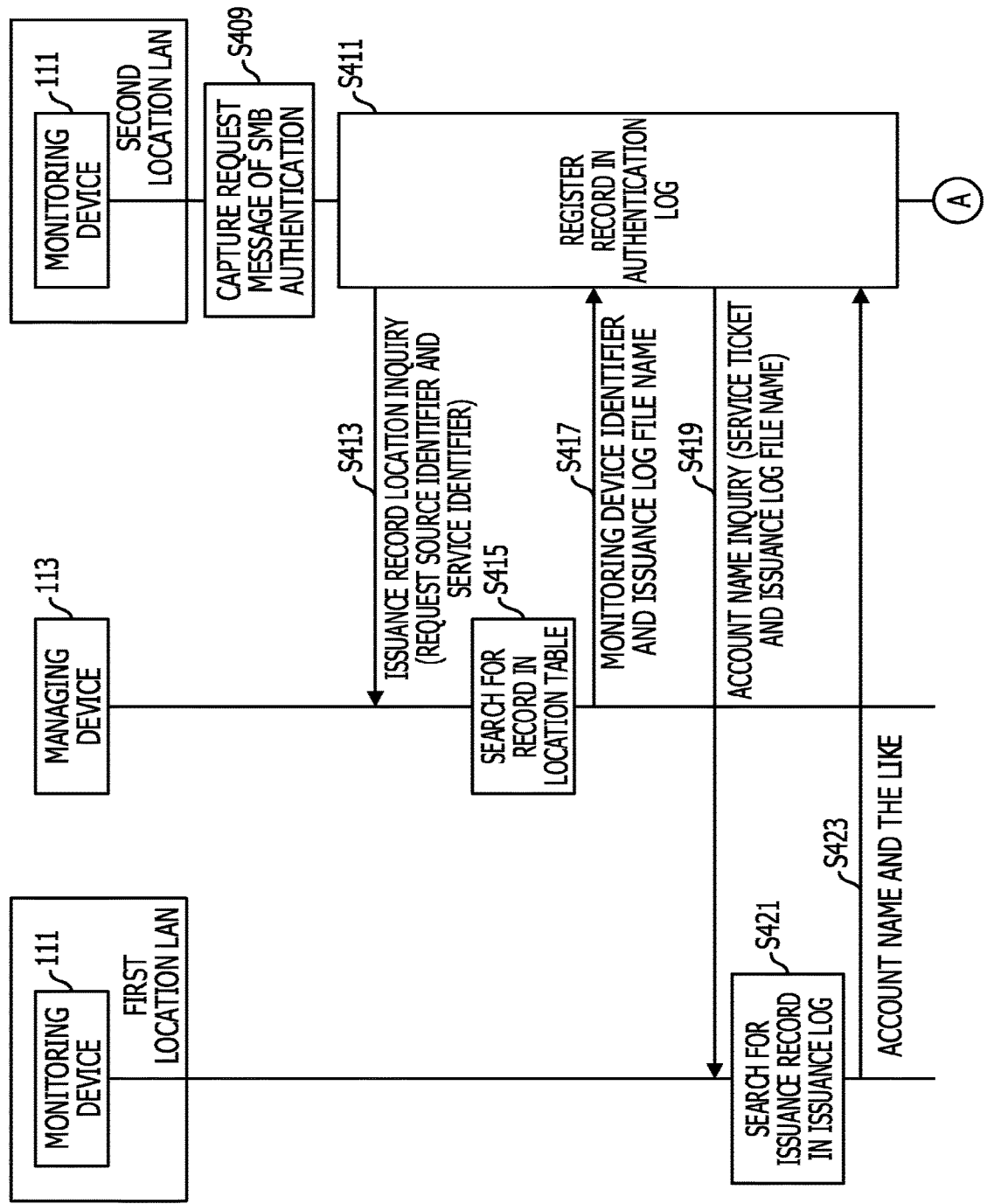
FIG. 4B is a diagram illustrating an example of a sequence of the network monitoring system.

A sequence related to the monitoring device 111 on the second location LAN will next be described with reference to FIG. 4B and FIG. 4C. The monitoring device 111 on the second location LAN captures the request message of SMB authentication which request message is illustrated in S309 in FIG. 3 (S409). The monitoring device 111 on the second location LAN then registers a record in an authentication log (S411). At this time, the monitoring device 111 on the second location LAN extracts the service ticket from the request message of SMB authentication, and obtains, by the following procedure, the account name from the issuance record in which the corresponding service ticket is set.

The monitoring device 111 on the second location LAN first inquires of the managing device 113 about the location of the issuance record. The monitoring device 111 on the second location LAN thereafter obtains the account name corresponding to the service ticket from the monitoring device 111 that retains the issuance record. Supplementary description of a concrete sequence will be made.

The monitoring device 111 on the second location LAN transmits an issuance record location inquiry to the managing device 113 (S413). The issuance record location inquiry includes the request source identifier and the service identifier.

When the managing device 113 receives the issuance record location inquiry, the managing device 113 searches for a record in the location table (S415). For example, the managing device 113 searches the location table for a record in which the request source identifier and the service identifier included in the location inquiry are set. The managing device 113 transmits the monitoring device identifier and the issuance log file name set in the identified record to the monitoring device 111 on the second location LAN (S417). Incidentally, when the issuance log file is uniquely determined, the issuance log file name may be omitted. Subsequent processing is performed similarly.

When the monitoring device 111 on the second location LAN receives the monitoring device identifier and the issuance log file name, the monitoring device 111 on the second location LAN transmits an account name inquiry to the monitoring device 111 on the first location LAN, the monitoring device 111 on the first location LAN being identified by the monitoring device identifier (S419). The account name inquiry includes the service ticket and the issuance log file name.

When the monitoring device 111 on the first location LAN receives the account name inquiry, the monitoring device 111 on the first location LAN searches for an issuance record in the issuance log (S421). For example, the monitoring device 111 on the first location LAN searches the issuance log identified by the issuance log file name included in the inquiry for a record in which the service ticket included in the inquiry is set. The monitoring device 111 on the first location LAN transmits the account name and the like set in the identified record to the monitoring device 111 on the second location LAN (S423).

In the record in the authentication log, the account name is associated with a connection between a transmission source (for example, the client computer 103 in FIG. 3) and a destination (for example, the server computer 101 on the second location LAN in FIG. 3) in the request message of SMB authentication. The authentication log will be described later with reference to FIG. 14.

Figure 4C:
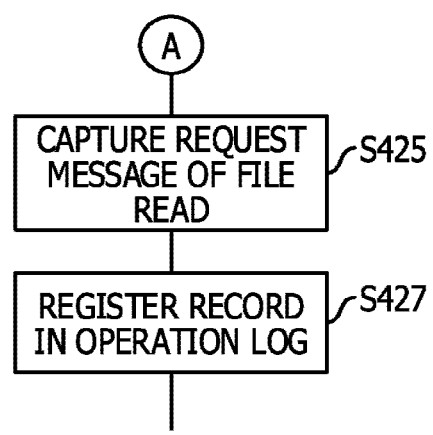
FIG. 4C is a diagram illustrating an example of a sequence of the network monitoring system.

The processing proceeds to a sequence of FIG. 4C via a terminal A. After registering the record in the authentication log, the monitoring device 111 on the second location LAN captures the request message of file read which request message is illustrated in S313 in FIG. 3 (S425). The monitoring device 111 on the second location LAN registers a record in an operation log (S427). At this time, the monitoring device 111 on the second location LAN identifies the account name corresponding to the connection in the request message of file read based on the authentication log. Then, the record in the operation log associates a description of the remote operation with the corresponding account name. This makes it possible to grasp account names based on which respective remote operations are performed. This concludes the description of the sequence.

Figure 5:
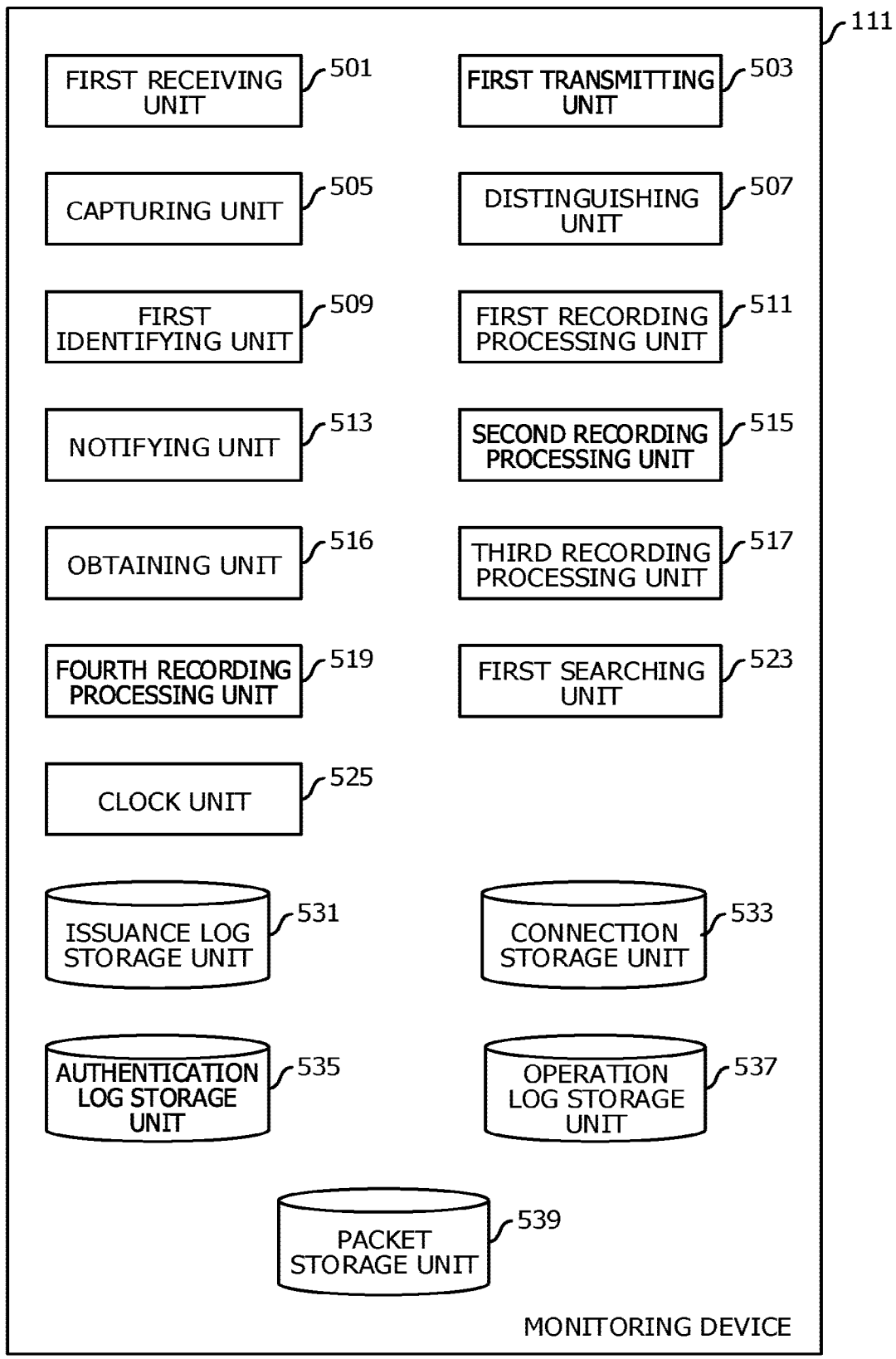
FIG. 5 is a diagram illustrating an example of module configuration of a monitoring device.

Operation of a monitoring device 111 will next be described. FIG. 5 illustrates an example of module configuration of the monitoring device 111. The monitoring device 111 includes a first receiving unit 501, a first transmitting unit 503, a capturing unit 505, a distinguishing unit 507, a first identifying unit 509, a first recording processing unit 511, a notifying unit 513, a second recording processing unit 515, an obtaining unit 516, a third recording processing unit 517, a fourth recording processing unit 519, a first searching unit 523, a clock unit 525, an issuance log storage unit 531, a connection storage unit 533, an authentication log storage unit 535, an operation log storage unit 537, and a packet storage unit 539.

The first receiving unit 501 receives various kinds of data. The first transmitting unit 503 transmits various kinds of data. The capturing unit 505 captures packets flowing through the network. The distinguishing unit 507 distinguishes kinds of the packets. The first identifying unit 509 performs connection identification processing. The first recording processing unit 511 performs first recording processing. The first recording processing records data on service ticket issuance in the issuance log. The notifying unit 513 notifies the location of an issuance record. The second recording processing unit 515 performs second recording processing. The second recording processing records data on SMB authentication in the authentication log. The obtaining unit 516 inquires of the managing device 113 about the location of an issuance record. Further, the obtaining unit 516 inquires of the monitoring device 111 about an account name. The third recording processing unit 517 performs third recording processing. The third recording processing records data on remote file access in the operation log. The fourth recording processing unit 519 performs fourth recording processing. The fourth recording processing records data on remote operations other than remote file access in the operation log. The first searching unit 523 searches for a service ticket in response to an account name inquiry. The clock unit 525 measures a date and time.

The issuance log storage unit 531 stores the issuance log. The connection storage unit 533 stores a connection table. The authentication log storage unit 535 stores the authentication log. The operation log storage unit 537 stores the operation log. The packet storage unit 539 stores captured packets. Details of the respective logs and the table will be described later.

The first receiving unit 501, the first transmitting unit 503, the capturing unit 505, the distinguishing unit 507, the first identifying unit 509, the first recording processing unit 511, the notifying unit 513, the second recording processing unit 515, the obtaining unit 516, the third recording processing unit 517, the fourth recording processing unit 519, the first searching unit 523, and the clock unit 525 described above are implemented by using hardware resources (for example, FIG. 33) and a program for making a processor perform processing to be described in the following.

Figure 33:
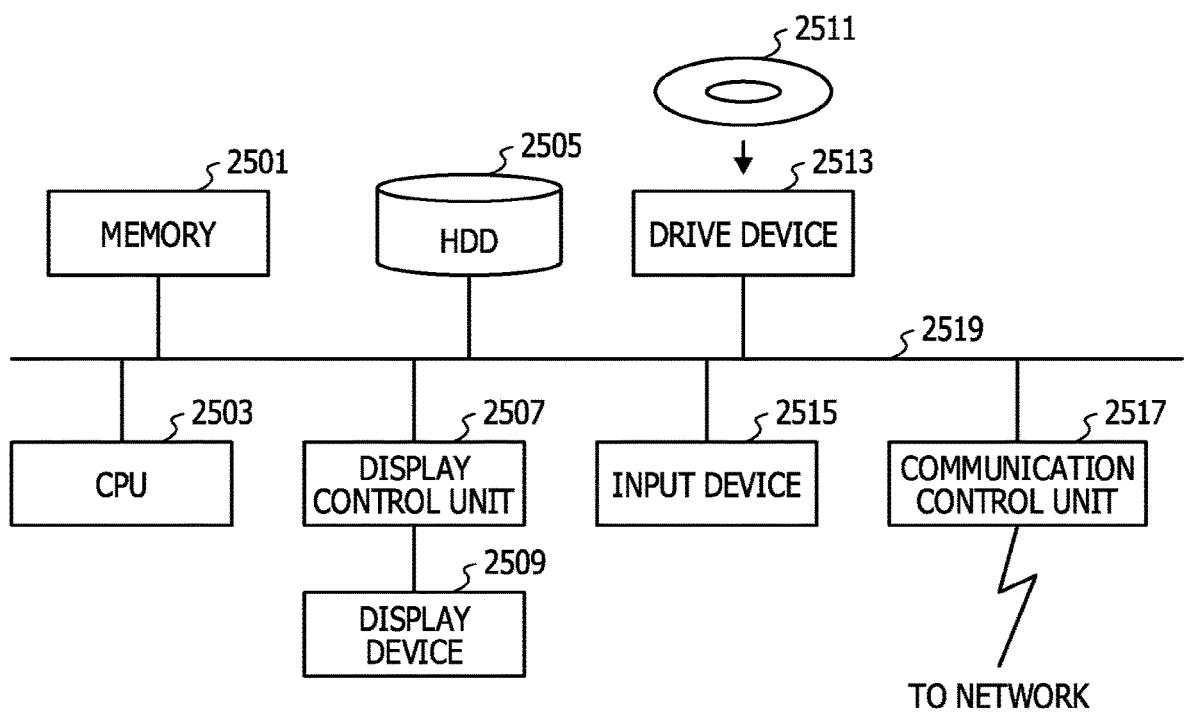
FIG. 33 is a functional block diagram of a computer.

The issuance log storage unit 531, the connection storage unit 533, the authentication log storage unit 535, the operation log storage unit 537, and the packet storage unit 539 described above are implemented by using hardware resources (for example, FIG. 33).

Figure 6:
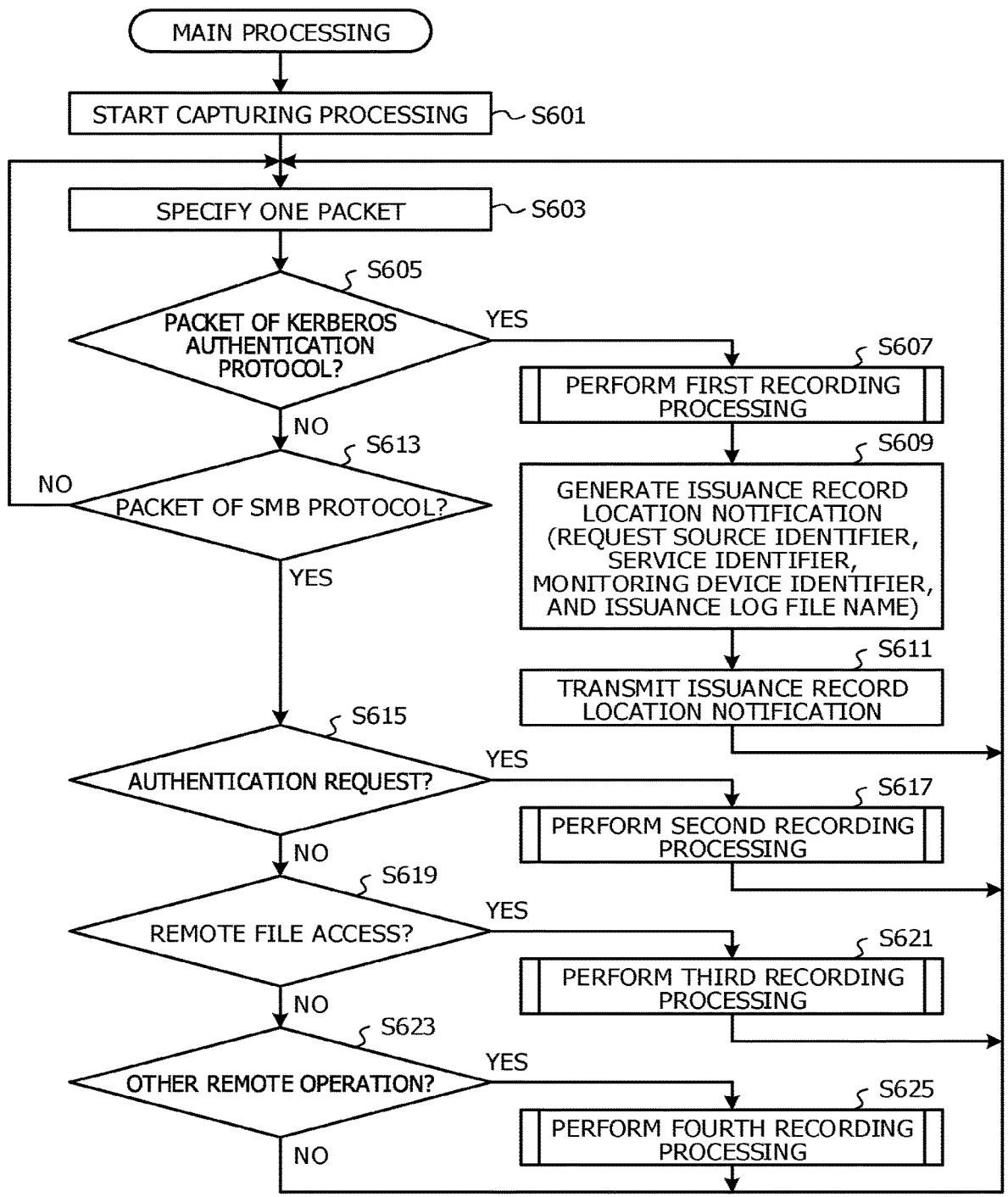
FIG. 6 is a diagram illustrating a flow of main processing of a monitoring device.

Processing in the monitoring device 111 will next be described. FIG. 6 illustrates a flow of main processing of the monitoring device 111. The capturing unit 505 starts capturing processing (S601). In the capturing processing, the capturing unit 505 captures packets flowing through the network (segment to which the monitoring device 111 belongs) via a switch capable of port mirroring or a network tap, the switch or the network tap being disposed between the monitoring device 111 and the network. The captured packets are stored in the packet storage unit 539. The capturing unit 505 attaches dates and times of capture to the stored packets. The dates and times are obtained from the clock unit 525.

The distinguishing unit 507 specifies one unprocessed packet among the captured packets (S603). The distinguishing unit 507, for example, specifies the packets in capturing order. The distinguishing unit 507 may discard already processed packets. When there is no unprocessed packet, the distinguishing unit 507 waits until a next packet is captured.

The distinguishing unit 507 determines whether or not the specified packet is a packet of the Kerberos authentication protocol (S605). For example, the distinguishing unit 507 determines that the packet in question is a packet of the Kerberos authentication protocol when a transmission source port number set in the packet in question is a number "88" assigned to Kerberos authentication. When it is determined that the packet in question is a packet of the Kerberos authentication protocol, the first recording processing unit 511 performs the first recording processing (S607).

Figure 7:
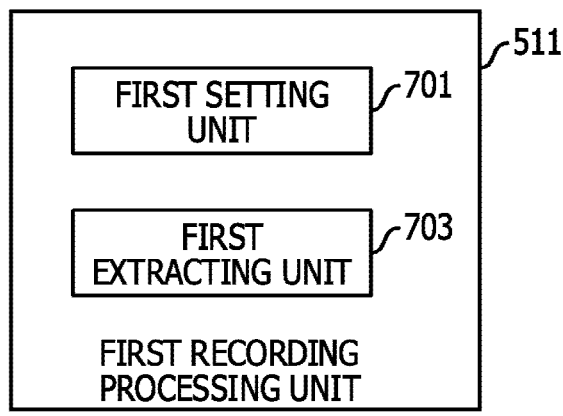
FIG. 7 is a diagram illustrating an example of module configuration of a first recording processing unit.

Before the first recording processing is described, an example of module configuration of the first recording processing unit 511 will be described. FIG. 7 illustrates an example of module configuration of the first recording processing unit 511. The first recording processing unit 511 includes a first setting unit 701 and a first extracting unit 703.

The first setting unit 701 sets various kinds of data in a new record in the issuance log. The first extracting unit 703 extracts various kinds of data from the packet of the Kerberos authentication protocol.

The first setting unit 701 and the first extracting unit 703 described above are implemented by using hardware resources (for example, FIG. 33) and a program for making a processor perform processing to be described in the following.

Figure 8:
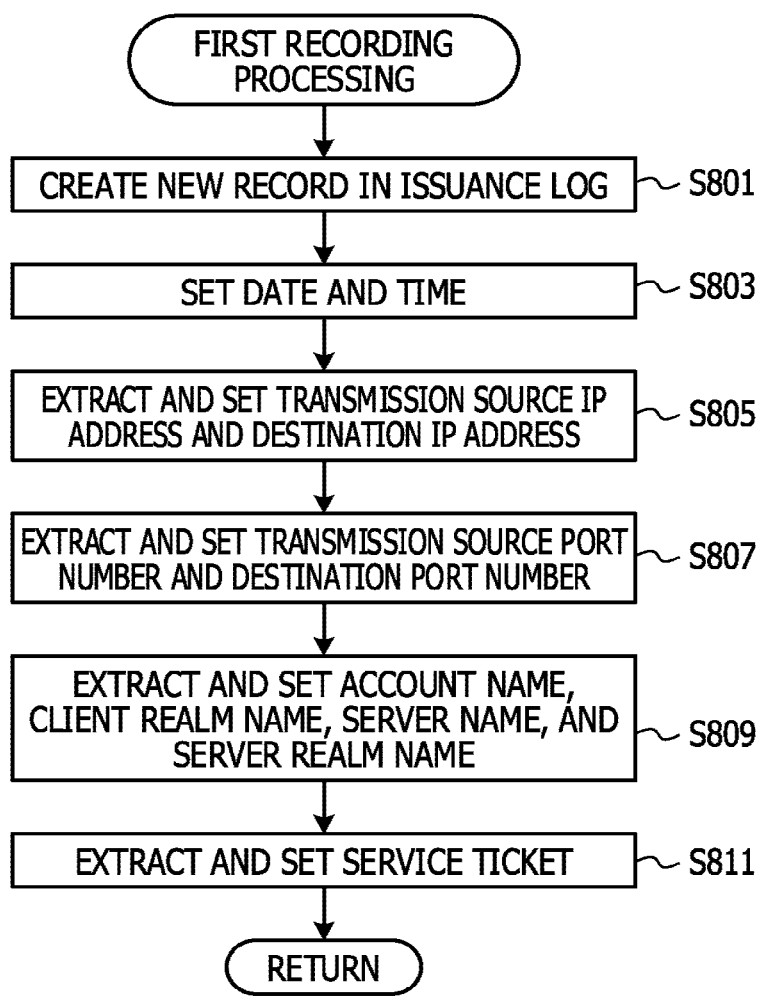
FIG. 8 is a diagram illustrating a flow of first recording processing.

FIG. 8 illustrates a flow of first recording processing. The first recording processing unit 511 creates a new record in the issuance log (S801).

FIG. 9 illustrates an example of configuration of an issuance log. The issuance log in the present example is in a table format. However, the issuance log may be in a format other than the table format. The issuance log in the present example includes a record corresponding to a response message of service ticket issuance. The record includes a field for setting a date and time, a field for setting a transmission source IP address, a field for setting a transmission source port number, a field for setting a destination IP address, a field for setting a destination port number, a field for setting a client realm name and an account name, a field for setting a server realm name and a server name, and a field for setting a service ticket.

The date and time is the date and time of capture of the packet of the response message. The transmission source IP address and the destination IP address are extracted from the IP header of the response message. The transmission source port number and the destination port number are extracted from the transmission control protocol (TCP) header or the user datagram protocol (UDP) header (hereinafter written as a UDP/TCP header) of the response message. The account name identifies an account that requested the service ticket. The client realm name identifies a realm to which the client computer 103 belongs. The server name identifies the server computer 101. The server realm name identifies a realm to which the server computer 101 belongs. While the client realm name and the account name are recorded integrally with each other in the present example, the client realm name and the account name may be recorded separately from each other. Similarly, while the server realm name and the server name are recorded integrally with each other, the server realm name and the server name may be recorded separately from each other.

The description returns to FIG. 8. The first setting unit 701 sets the date and time of capture of the packet specified in S603 in the new record (S803).

The first extracting unit 703 extracts a transmission source IP address and a destination IP address from the IP header of the packet, and the first setting unit 701 sets the extracted transmission source IP address and the extracted destination IP address in the new record (S805). The first extracting unit 703 extracts a transmission source port number and a destination port number from the UDP/TCP header of the packet, and the first extracting unit 703 sets the extracted transmission source port number and the extracted destination port number in the new record (S807).

The first extracting unit 703 extracts an account name, a client realm name, a server name, and a server realm name from the packet, and the first setting unit 701 sets the extracted account name, the extracted client realm name, the extracted server name, and the extracted server realm name in the new record (S809).

The first extracting unit 703 extracts a service ticket from the packet, and the first setting unit 701 sets the extracted service ticket in the new record (S811). When the first recording processing is ended, a return is made to the main processing illustrated in FIG. 6.

The description returns to FIG. 6. The notifying unit 513 generates an issuance record location notification (including a request source identifier, a service identifier, a monitoring device identifier, and an issuance log file name) (S609). The notifying unit 513 transmits the issuance record location notification to the managing device 113 via the first transmitting unit 503 (S611). Then, a return is made to the processing illustrated in S603 to repeat the above-described processing.

When determining in S605 that the packet specified in S603 is not a packet of the Kerberos authentication protocol, the distinguishing unit 507 determines whether or not the packet in question is a packet of the SMB protocol (S613). For example, the distinguishing unit 507 determines that the packet in question is an SMB packet when data indicating the SMB protocol is set in the packet in question. When it is determined that the packet in question is not an SMB packet, a return is made to the processing illustrated in S603 to repeat the above-described processing. The SMB packet refers to a packet used by control based on the SMB protocol.

Figure 10:
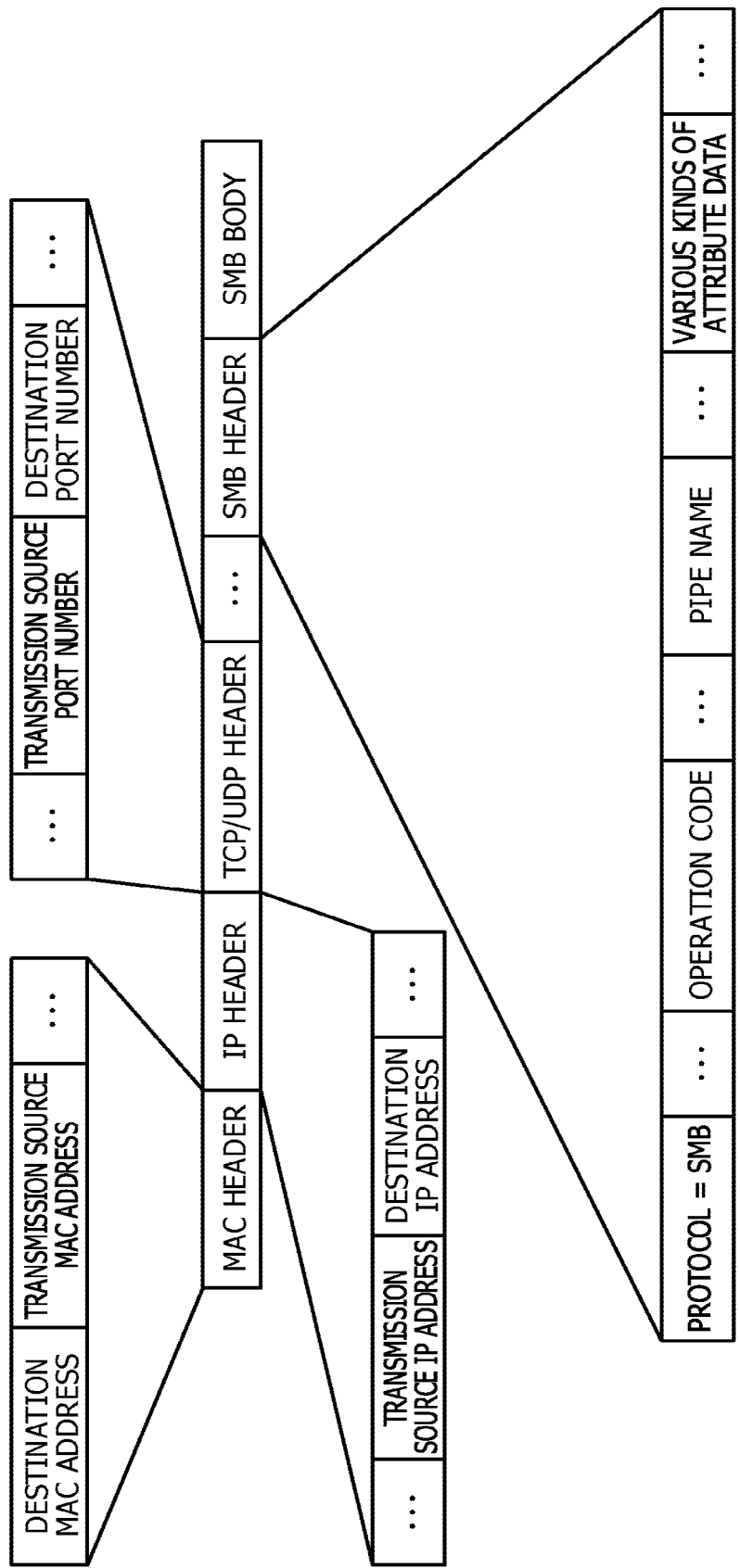
FIG. 10 is a diagram illustrating a configuration of a server message block (SMB) packet.

FIG. 10 illustrates a configuration of an SMB packet. As illustrated in FIG. 10, a media access control (MAC) header includes a field in which a destination MAC address is set and a field in which a transmission source MAC address is set. The transmission source MAC address is the MAC address of a computer that sends the packet. The destination MAC address is the MAC address of a computer that receives the packet.

In addition, an IP header includes a field in which a transmission source IP address is set and a field in which a destination IP address is set. The transmission source IP address is the IP address of the computer that sends the packet. The destination IP address is the IP address of the computer that receives the packet.

In a case where the SMB packet is sent according to TCP, the packet includes a TCP header. In a case where the SMB packet is sent according to UDP, the packet includes a UDP header. In either case of the TCP header or the UDP header, the header includes a field in which a transmission source port number is set and a field in which a destination port number is set. The transmission source port number is the number of a port that sends out the packet. The destination port number is the number of a port that receives the packet.

Incidentally, in the present example, a header related to NetBios is omitted.

The SMB packet includes an SMB header and an SMB body. The SMB header includes a field in which a protocol is set, a field in which an operation code is set, and a field in which a pipe name is set. The identifier of SMB is set as the protocol. Incidentally, the identifier of SMB includes a version of SMB. The operation code is the identifier of a command (corresponding to remote operation) in SMB. The pipe name is the name of a pipe as one form of data transmission. The pipe name is uniquely set for a service. Hence, the service used is identified by the pipe name.

The SMB header includes various kinds of attribute data. However, attribute items and storage positions thereof may differ depending on the kind of the SMB packet. The kind of the SMB packet is distinguished by both or one of the operation code and the pipe name. An example of the attribute data will be described later.

The description returns to FIG. 6. When determining in S613 that the packet specified in S603 is an SMB packet, the distinguishing unit 507 further determines whether or not the packet specified in S603 corresponds to a request message of SMB authentication (S615). For example, the distinguishing unit 507 determines that the packet in question corresponds to a request message of SMB authentication when an operation code of SMB authentication (corresponding to Session establishment) is set in the SMB header.

When it is determined that the packet in question corresponds to a request message of SMB authentication, the second recording processing unit 515 performs the second recording processing (S617).

Before the second recording processing is described, description will be made of a configuration of the request message of SMB authentication and an example of module configuration of the second recording processing unit 515.

Figure 11:
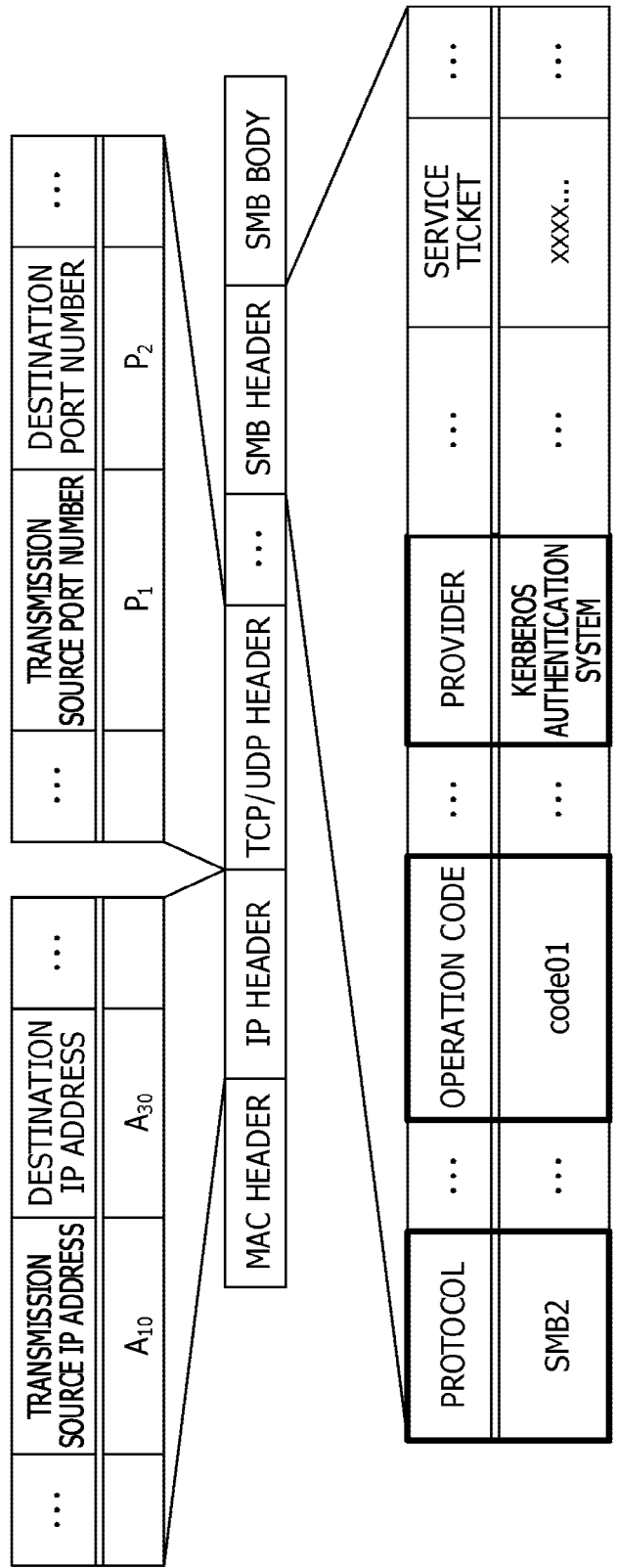
FIG. 11 is a diagram illustrating an example of a request message of SMB authentication.

FIG. 11 illustrates an example of a request message of SMB authentication. In the present example, computers are distinguished by IP addresses, and therefore no mention will be made of MAC addresses. However, the computers may be distinguished by the MAC addresses.

Suppose that the request message of SMB authentication which request message is illustrated in FIG. 11 is sent from a computer having an IP address "$A_{10}$" to a computer having an IP address "$A_{30}$." Hence, "$A_{10}$" is set in the field of the transmission source IP address, and "$A_{30}$" is set in the field of the destination IP address.

Suppose that the request message is sent from a port having a port number "$P_1$" in the computer as a transmission source to a port having a port number "$P_2$" in the computer as a destination. Hence, "$P_1$" is set in the field of the transmission source port number, and "$P_2$" is set in the field of the destination port number.

Suppose that a procedure for SMB authentication in the present example is compliant with a version 2 of SMB. Accordingly, "SMB2" is set in the field of the protocol. An operation code "code01" corresponds to an authentication request. A provider identifies an authentication system. The provider may be referred to as a security blob. In the present example, the "Kerberos authentication system" is set. Incidentally, while "NTLM (NT LAN Manager)" may be set as the provider, authentication based on NTLM is not an object for logging in the present embodiment.

It is determined that the packet in question corresponds to a request message of SMB authentication when the packet meets a condition that the protocol set in the captured packet be "SMB2" and also the operation code set in the captured packet be "code01."

Figure 12:
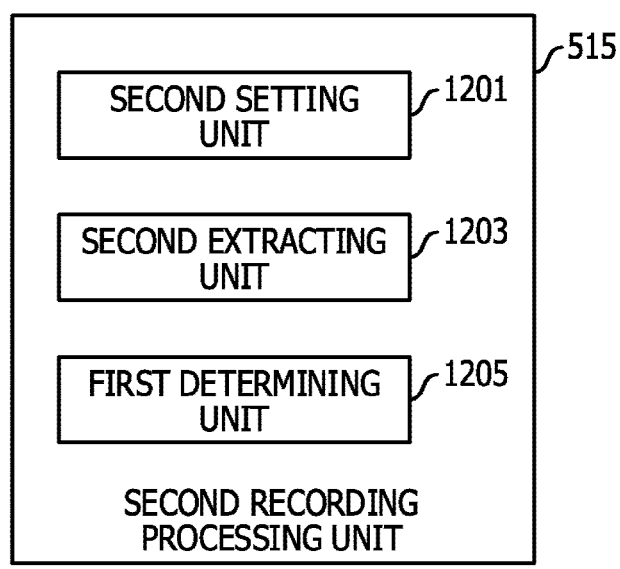
FIG. 12 is a diagram illustrating an example of module configuration of a second recording processing unit.

FIG. 12 illustrates an example of module configuration of a second recording processing unit. The second recording processing unit illustrated in FIG. 12 may be the second recording processing unit 515 illustrated in FIG. 5. The second recording processing unit 515 includes a second setting unit 1201, a second extracting unit 1203, and a first determining unit 1205.

The second setting unit 1201 sets various kinds of data in a new record in the authentication log. The second extracting unit 1203 extracts various kinds of data from the packet corresponding to the request message of SMB authentication. The first determining unit 1205 determines whether or not the "Kerberos authentication system" is set in the field of the provider in the request message of SMB authentication.

The second setting unit 1201, the second extracting unit 1203, and the first determining unit 1205 described above are implemented by using hardware resources (for example, FIG. 33) and a program for making a processor perform processing to be described in the following.

Figure 13A:
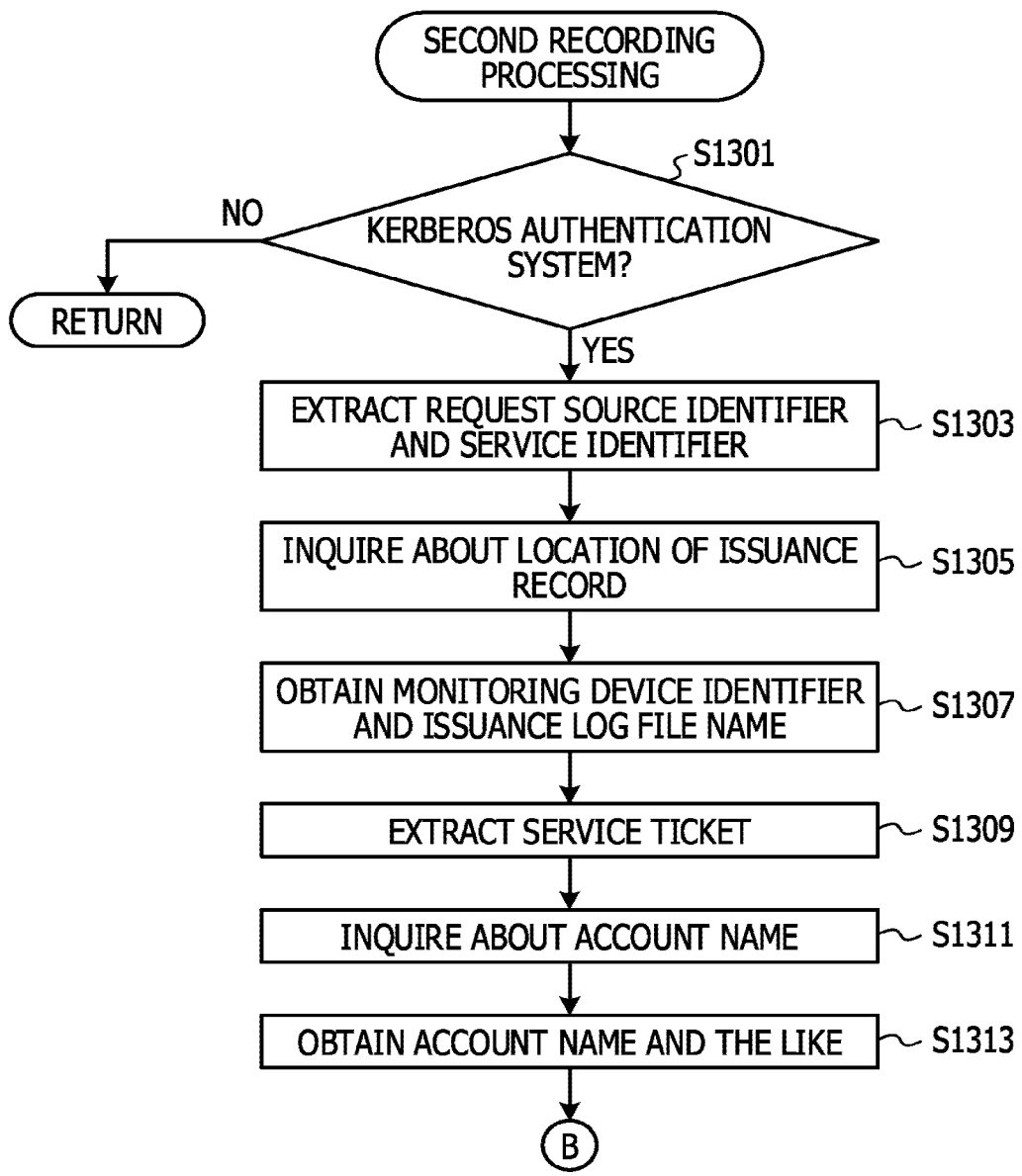
FIG. 13A is a diagram illustrating a flow of second recording processing.
Figure 13B:
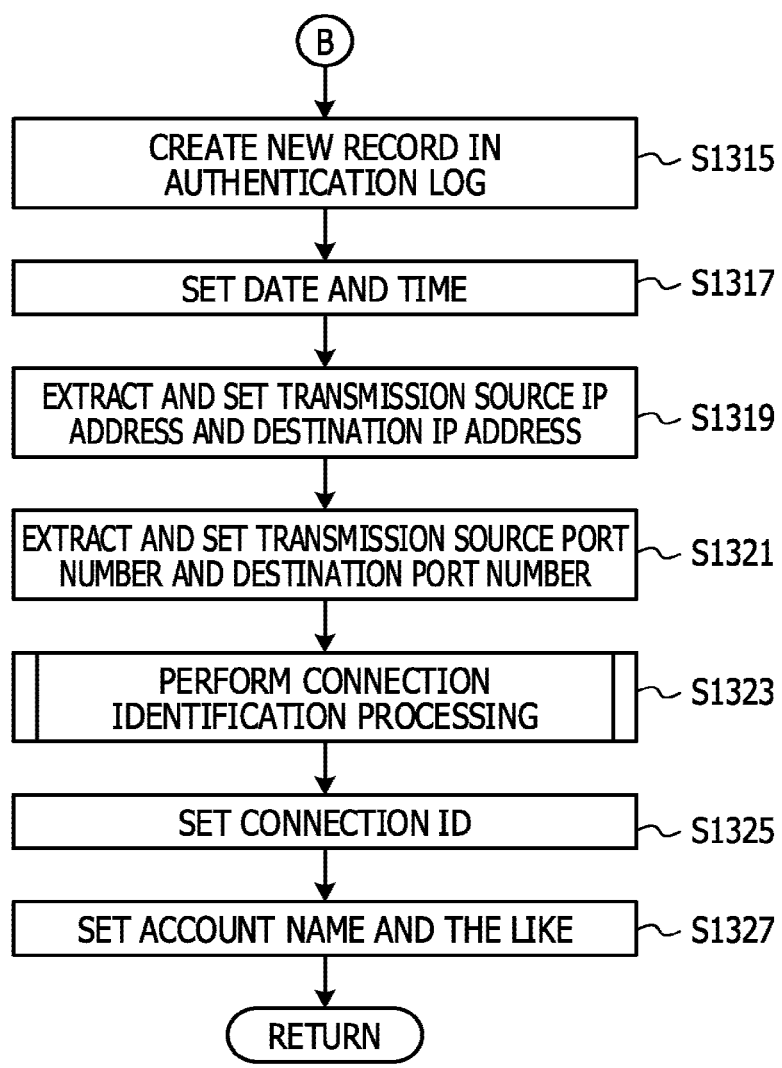
FIG. 13B is a diagram illustrating a flow of the second recording processing.

The second recording processing will next be described. FIG. 13A and FIG. 13B illustrate a flow of the second recording processing. The first determining unit 1205 determines whether or not the "Kerberos authentication system" is set in the field of the provider (S1301). When it is determined that the "Kerberos authentication system" is not set in the field of the provider, the second recording processing is ended, and a return is made to the processing of S603 illustrated in FIG. 6 to repeat the above-described processing.

When it is determined in S1301 that the "Kerberos authentication system" is set in the field of the provider, the second extracting unit 1203 extracts a request source identifier and a service identifier (S1303). The obtaining unit 516 inquires about the location of an issuance record (S1305). For example, the first transmitting unit 503 transmits an issuance record location inquiry (including the request source identifier and the service identifier) to the managing device 113. The obtaining unit 516 obtains a monitoring device identifier and an issuance log file name (S1307). For example, the first receiving unit 501 receives the monitoring device identifier and the issuance log file name from the managing device 113. The second extracting unit 1203 extracts a service ticket (S1309). The obtaining unit 516 inquires about an account name (S1311). For example, the first transmitting unit 503 transmits an account name inquiry (including the service ticket and the issuance log file name) to the monitoring device 111 identified by the monitoring device identifier. The obtaining unit 516 obtains an account name, a client realm name, a server name, and a server realm name (S1313). For example, the first receiving unit 501 receives the account name, the client realm name, the server name, and the server realm name from the monitoring device 111. The flow then proceeds to the processing of S1315 illustrated in FIG. 13B via a terminal B.

The description proceeds to FIG. 13B. The second recording processing unit 515 creates a new record in the authentication log (S1315).

FIG. 14 illustrates an example of configuration of an authentication log. The authentication log in the present example is in a table format. However, the authentication log may be in a format other than the table format. The authentication log in the present example includes a record corresponding to a request message of SMB authentication based on the Kerberos authentication system. The record includes a field for setting a date and time, a field for setting a transmission source IP address, a field for setting a transmission source port number, a field for setting a destination IP address, a field for setting a destination port number, a field for setting a connection ID, a field for setting a client realm name and an account name, and a field for setting a server realm name and a server name.

The date and time is the date and time of capture of the packet of the request message. The transmission source IP address and the destination IP address are extracted from the IP header of the request message. The transmission source port number and the destination port number are extracted from the TCP/UDP header of the request message. The account name identifies an account that requested SMB authentication. The client realm name identifies a realm to which the client computer 103 belongs. The server name identifies the server computer 101. The server realm name identifies a realm to which the server computer 101 belongs. While the client realm name and the account name are recorded integrally with each other in the present example, the client realm name and the account name may be recorded separately from each other. Similarly, while the server realm name and the server name are recorded integrally with each other, the server realm name and the server name may be recorded separately from each other.

The description returns to FIG. 13B. The second setting unit 1201 sets the date and time of capture of the packet specified in S603 in the new record (S1317).

The second extracting unit 1203 extracts a transmission source IP address and a destination IP address from the IP header of the packet, and the second setting unit 1201 sets the extracted transmission source IP address and the extracted destination IP address in the new record (S1319). The second extracting unit 1203 extracts a transmission source port number and a destination port number from the UDP/TCP header of the packet, and the second setting unit 1201 sets the extracted transmission source port number and the extracted destination port number in the new record (S1321).

The first identifying unit 509 performs connection identification processing (S1323). In the connection identification processing, the first identifying unit 509 identifies a connection by which the packet specified in S603 is transmitted.

Figure 15:
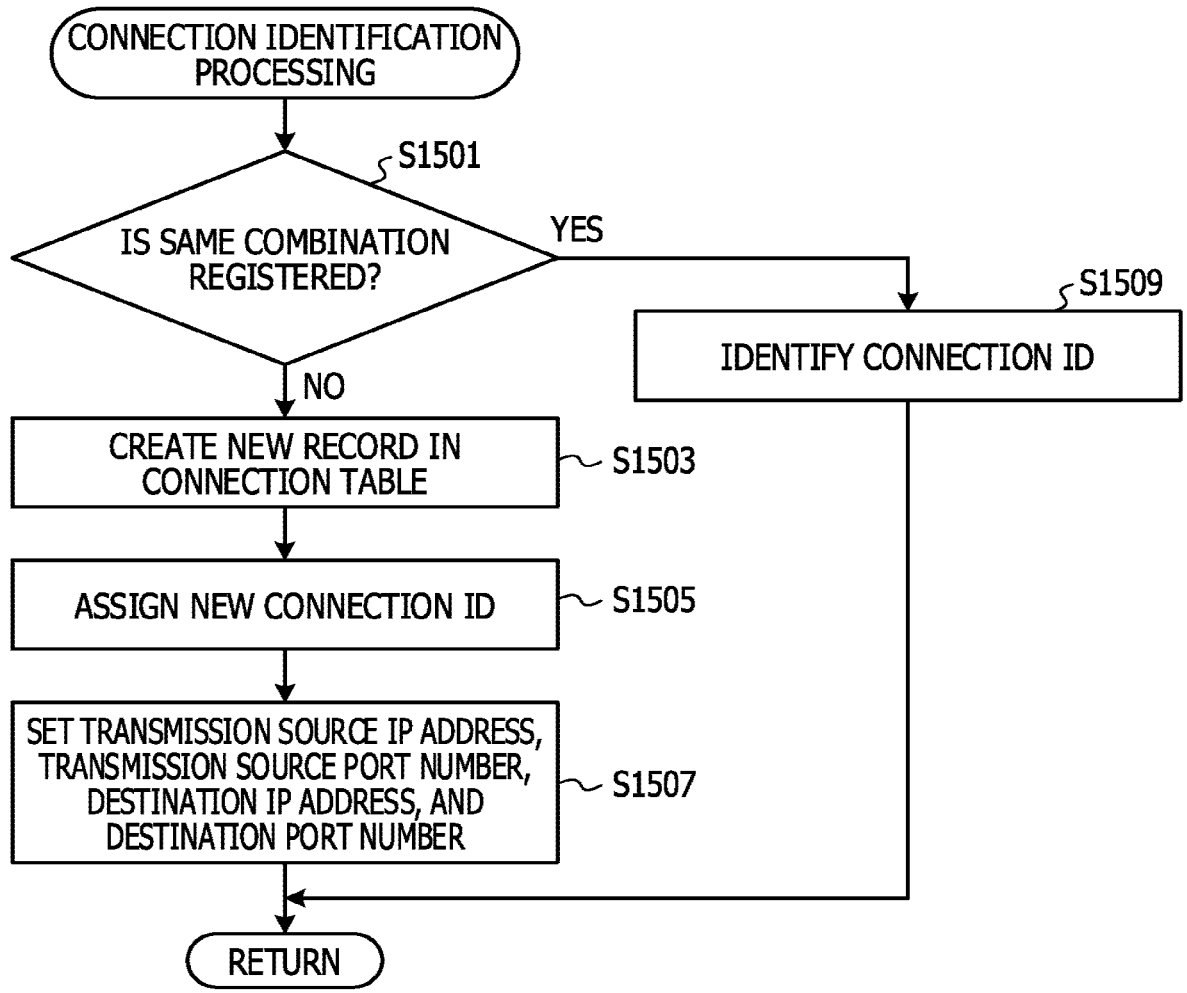
FIG. 15 is a diagram illustrating a flow of connection identification processing.

FIG. 15 illustrates a flow of connection identification processing. The first identifying unit 509 determines whether or not a same combination as a combination of the transmission source IP address extracted in S1319, the transmission source port number extracted in S1321, the destination IP address extracted in S1319, and the destination port number extracted in S1321 is already registered in the connection table (S1501).

FIG. 16 illustrates an example of configuration of a connection table. The connection table in the present example includes a record corresponding to a connection. The record includes a field for setting a connection ID, a field for setting a transmission source IP address, a field for setting a transmission source port number, a field for setting a destination IP address, and a field for setting a destination port number.

The connection ID identifies the connection. The connection is specified by the combination of the transmission source IP address, the transmission source port number, the destination IP address, and the destination port number.

The description returns to FIG. 15. When the first identifying unit 509 determines in S1501 that the above-described combination is not registered in the connection table, the first identifying unit 509 creates a new record in the connection table (S1503). The first identifying unit 509 assigns a new connection ID to the new record (S1505). The first identifying unit 509 sets, in the new record, the transmission source IP address extracted in S1319, the transmission source port number extracted in S1321, the destination IP address extracted in S1319, and the destination port number extracted in S1321 (S1507). Then, a return is made to the second recording processing illustrated in FIG. 13B. In this case, the second recording processing identifies the connection by the connection ID assigned in S1505.

When the first identifying unit 509 determines in S1501 that the above-described combination is registered in the connection table, on the other hand, the first identifying unit 509 identifies a connection ID corresponding to the above-described combination (S1509). Then, a return is made to the second recording processing illustrated in FIG. 13B.

The description returns to FIG. 13B. The second setting unit 1201 sets the connection ID identified in the processing of S1323 in the new record created in S1315 (S1325).

The second setting unit 1201 sets the account name, the client realm name, the server name, and the server realm name obtained in S1313 in FIG. 13A in the new record (S1327). When the second recording processing is ended, a return is made to the processing of S603 illustrated in FIG. 6 to repeat the above-described processing.

The description returns to FIG. 6. When the distinguishing unit 507 determines in S615 that the packet specified in S603 does not correspond to a request message of SMB authentication, the distinguishing unit 507 determines whether or not the packet in question corresponds to a request message of remote file access (S619). For example, the distinguishing unit 507 determines that the packet in question corresponds to a request message of remote file access when an operation code of remote file access (corresponding to Open) is set in the SMB header. Incidentally, remote file access is established by a plurality of request messages. Hence, it is determined that a packet that is subsequent to a packet having the operation code corresponding to "Open" set therein (the packet having the operation code corresponding to "Open" set therein will hereinafter be referred to as a first request message) according to a given sequence of remote file access also corresponds to a request message of remote file access (the subsequent packet will hereinafter be referred to as a second request message).

Figure 17:
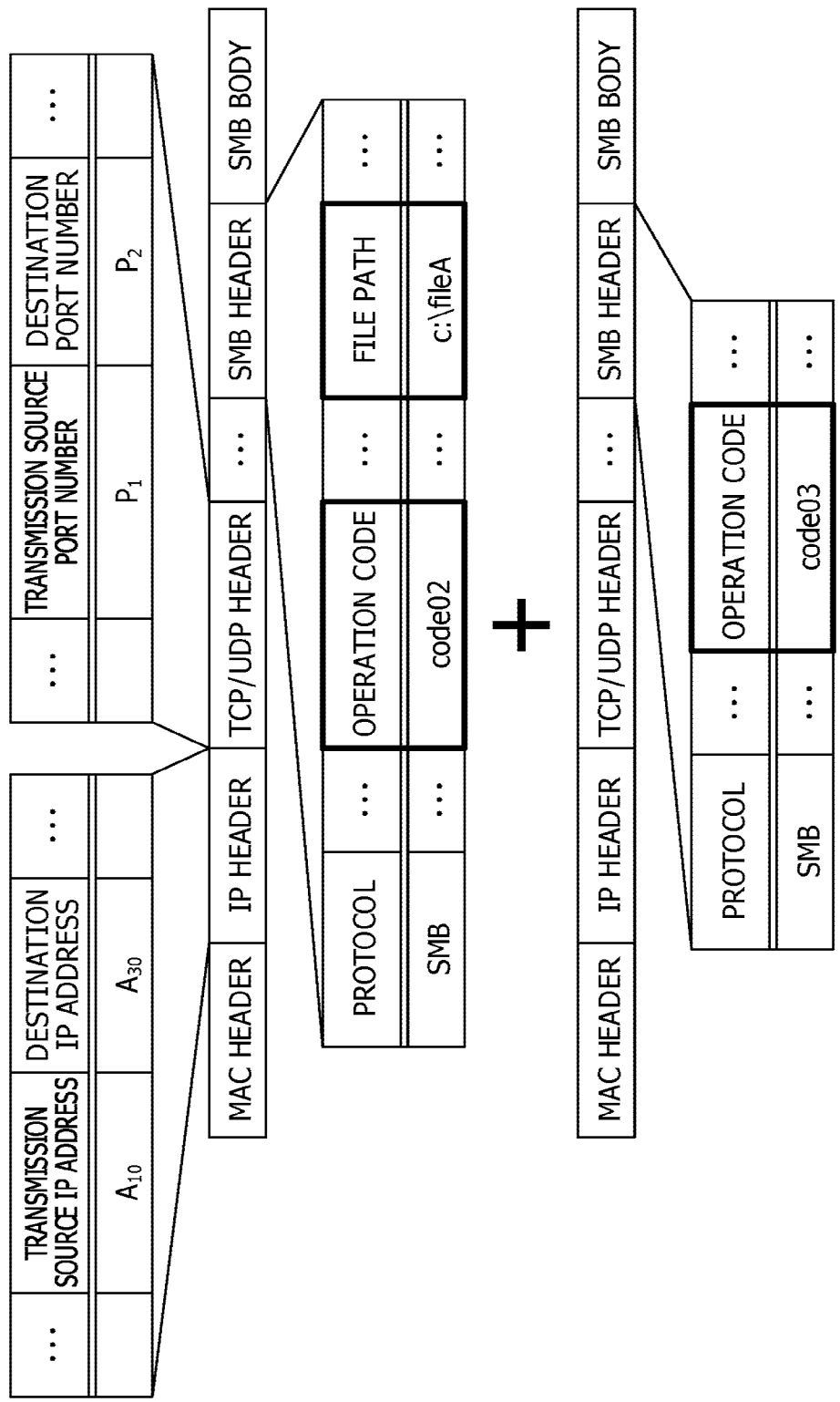
FIG. 17 is a diagram illustrating an example of a request message of file read.

FIG. 17 illustrates an example of a request messages of file read. Depending on the kind of remote operation, there is a case where the processing of remote operation is completed by sending out one request message, and there is a case where the processing of remote operation is completed by sending out a plurality of request messages. Examples illustrated in FIG. 17 and FIG. 21 to be described later each correspond to the case where a plurality of request messages are sent out.

Suppose that the first request message in file read which first request message is illustrated in an upper part of FIG. 17 is sent from the computer having the IP address "$A_{10}$" to the computer having the IP address "$A_{30}$." Hence, "$A_{10}$" is set in the field of a transmission source IP address, and "$A_{30}$" is set in the field of a destination IP address. Incidentally, the second request message in file read which second request message is illustrated in a lower part of FIG. 17 is similar.

Suppose that the first request message in file read which first request message is illustrated in the upper part is sent from the port having the port number "$P_1$" in the computer as a transmission source to the port having the port number "$P_2$" in the computer as a destination. Hence, "$P_1$" is set in the field of a transmission source port number, and "$P_2$" is set in the field of a destination port number. Incidentally, the second request message in file read which second request message is illustrated in the lower part is similar.

Suppose that a procedure for file read in the present example is compliant with a version 1 of SMB. Hence, "SMB" is set in the field of a protocol.

An operation code "code02" in the first request message corresponds to Open. The operation code in the case of the version 1 of SMB is 1 byte. The operation code "code02" in the first request message denotes a request for file access. An operation code "code03" in the second request message indicates that the kind of the file access is file read.

When the operation code set in the first request message is "code02," and the operation code set in the second request message (whose protocol, transmission source IP address, transmission source port number, destination IP address, and destination port number are the same as in the first request message) is "code03," it is determined that these request messages request file read. Incidentally, a file path is set in the first request message.

The description returns to FIG. 6. When it is determined that the packet in question corresponds to a request message of remote file access, the third recording processing unit 517 performs the third recording processing (S621).

Figure 18:
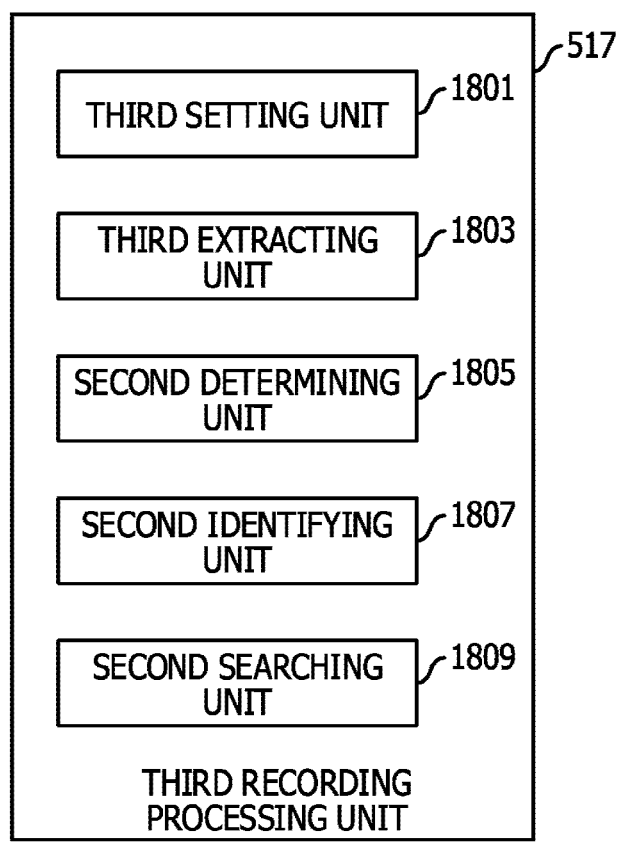
FIG. 18 is a diagram illustrating an example of module configuration of a third recording processing unit.

Before the third recording processing is described, module configuration of the third recording processing unit 517 will be described. FIG. 18 illustrates an example of module configuration of the third recording processing unit 517. The third recording processing unit 517 includes a third setting unit 1801, a third extracting unit 1803, a second determining unit 1805, a second identifying unit 1807, and a second searching unit 1809.

The third setting unit 1801 sets various kinds of data in a new record in the operation log. The third extracting unit 1803 extracts various kinds of data from the packets corresponding to the request messages of remote file access. The second determining unit 1805 determines whether or not a packet to be processed is the first request message. The second identifying unit 1807 identifies a command name. The second searching unit 1809 searches for a record including a specific connection ID in the authentication log.

The third setting unit 1801, the third extracting unit 1803, the second determining unit 1805, the second identifying unit 1807, and the second searching unit 1809 described above are implemented by using hardware resources (for example, FIG. 33) and a program for making a processor perform processing to be described in the following.

Figure 19:
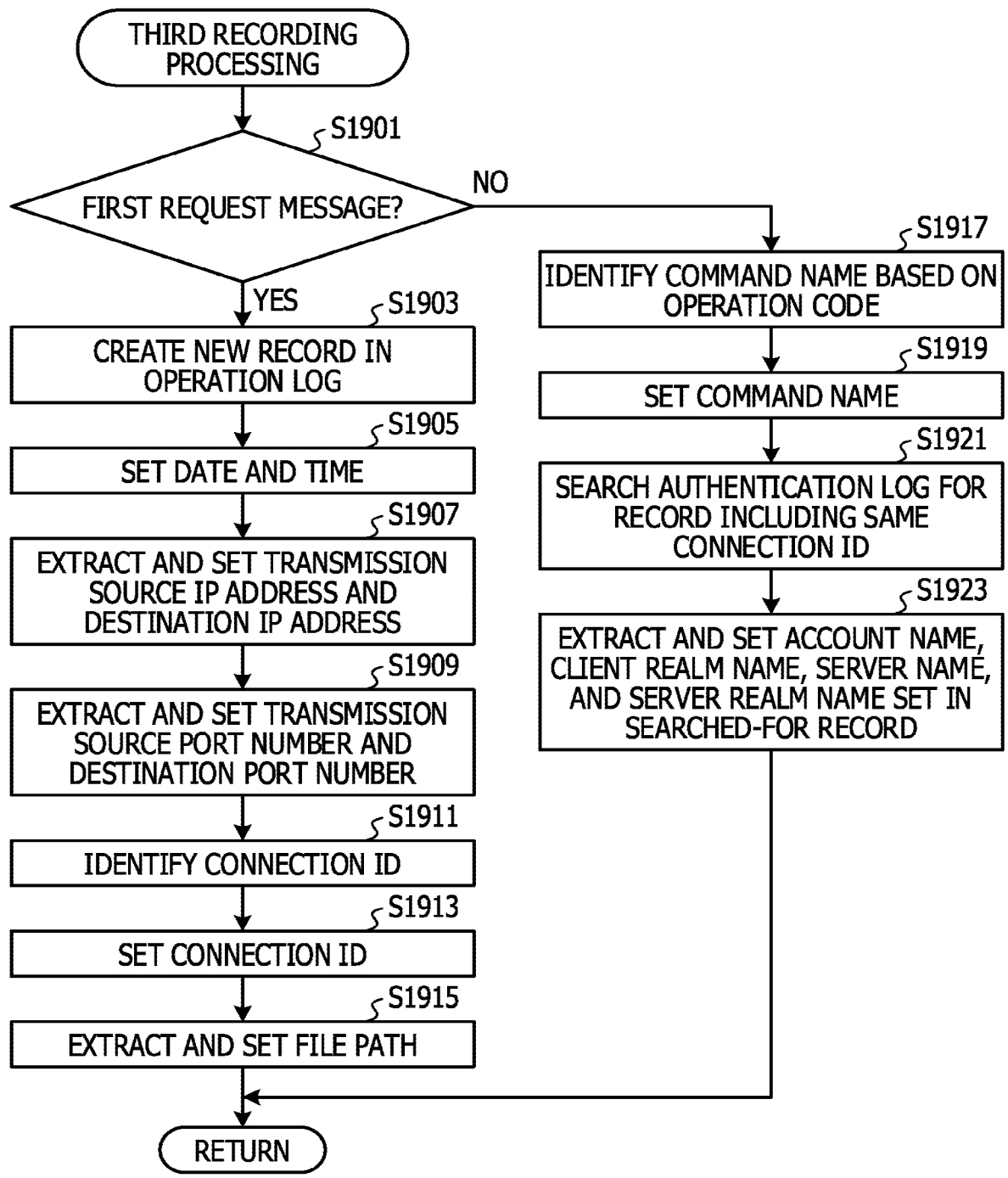
FIG. 19 is a diagram illustrating a flow of third recording processing.

FIG. 19 illustrates a flow of a third recording processing. The third recording processing sets, in the operation log, data based on the first request message and the second request message related to remote file access. The second determining unit 1805 determines whether or not the packet specified in S603 is a packet in which the operation code corresponding to "Open" is set, for example, the first request message (S1901).

When it is determined that the packet in question is the first request message, the third recording processing unit 517 creates a new record in the operation log (S1903).

FIG. 20 illustrates an example of configuration of an operation log. The operation log in the present example is in a table format. However, the operation log may be in a format other than the table format. The operation log in the present example includes a record corresponding to a request message of remote operation. The record includes a field for setting a date and time, a field for setting a transmission source IP address, a field for setting a transmission source port number, a field for setting a destination IP address, a field for setting a destination port number, a field for setting a connection ID, a field for setting a command name and an option, and a field for setting attribute data.

In the present example, the field for setting the attribute data is divided into a field for setting a client realm name and an account name, a field for setting a server realm name and a server name, and a field for setting a path or an account name. However, the field for setting the attribute data may have a field for setting another attribute item. In addition, the field for setting the attribute data may be set as an integral field, and one or a plurality of arbitrary attributes may be set in the field.

The date and time is the date and time of capture of the packet of the request message. The transmission source IP address and the destination IP address are extracted from the IP header of the request message. The transmission source port number and the destination port number are extracted from the TCP header of the request message. The connection ID identifies a connection by which the request message is transmitted. The command name and the option represent a description of the remote operation. The option may not be set. The client realm name identifies a realm to which the client computer 103 belongs. The server name identifies the server computer 101. The server realm name identifies a realm to which the server computer 101 belongs. While the client realm name and the account name are recorded integrally with each other in the present example, the client realm name and the account name may be recorded separately from each other. Similarly, while the server realm name and the server name are recorded integrally with each other, the server realm name and the server name may be recorded separately from each other. In the present example, in a case where the command name is "file read," a file path is set in the field of the path or the account name. Similarly, in a case where the command name is "user registration," an account name is set in the field of the path or the account name.

The description returns to FIG. 19. The third setting unit 1801 sets the date and time of capture of the packet in the new record (S1905).

The third extracting unit 1803 extracts a transmission source IP address and a destination IP address from the IP header of the packet, and the third setting unit 1801 sets the extracted transmission source IP address and the extracted destination IP address in the new record (S1907). Further, the third extracting unit 1803 extracts a transmission source port number and a destination port number from the TCP header or the UDP header of the packet, and the third setting unit 1801 sets the extracted transmission source port number and the extracted destination port number in the new record (S1909).

The first identifying unit 509 refers to the connection table, and identifies a connection ID corresponding to the combination of the transmission source IP address, the transmission source port number, the destination IP address, and the destination port number (S1911). The third setting unit 1801 sets the connection ID in the new record (S1913).

The third extracting unit 1803 extracts a file path from the SMB header of the packet, and the third setting unit 1801 sets the extracted file path in the field of the path or the account name in the new record (51915). This concludes the setting of data based on the first request message. Then, a return is made to the processing of S603 illustrated in FIG. 6 to repeat the above-described processing.

On the other hand, when it is determined in S1901 that the packet is not the first request message, for example, that the packet is the second request message, the flow proceeds to processing illustrated in S1917.

The second identifying unit 1807 identifies a command name based on an operation code (S1917). For example, when the operation code is "code03," a file read command is identified. The third setting unit 1801 sets the identified command name in the record whose data is set based on the first request message (S1919).

The second searching unit 1809 searches the authentication log for a record including the same connection ID as the connection ID identified in the processing of S1911 which processing is performed on the first request message (S1921).

The third extracting unit 1803 extracts an account name, a client realm name, a server name, and a server realm name that are set in the searched-for record, and the third setting unit 1801 sets the extracted account name, the extracted client realm name, the extracted server name, and the extracted server realm name in the new record in the operation log (S1923). When the third recording processing is ended, a return is made to the processing of S603 illustrated in FIG. 6 to repeat the above-described processing.

The description returns to FIG. 6. When the distinguishing unit 507 determines in S619 that the packet specified in S603 does not correspond to a request message of remote file access, the distinguishing unit 507 determines whether or not the packet specified in S603 corresponds to a request message of other remote operation, for example, remote operation other than remote file access (which remote operation will hereinafter be referred to as other remote operation in the description of FIG. 6) (S623). For example, the distinguishing unit 507 determines that the packet in question corresponds to a request message of other remote operation when the combination of the operation code and the pipe name set in the SMB header (or either the operation code or the pipe name) corresponds to one of patterns assumed as other remote operations.

When it is determined that the packet in question corresponds to a request message of other remote operation, the fourth recording processing unit 519 performs the fourth recording processing (S625).

Figure 23:
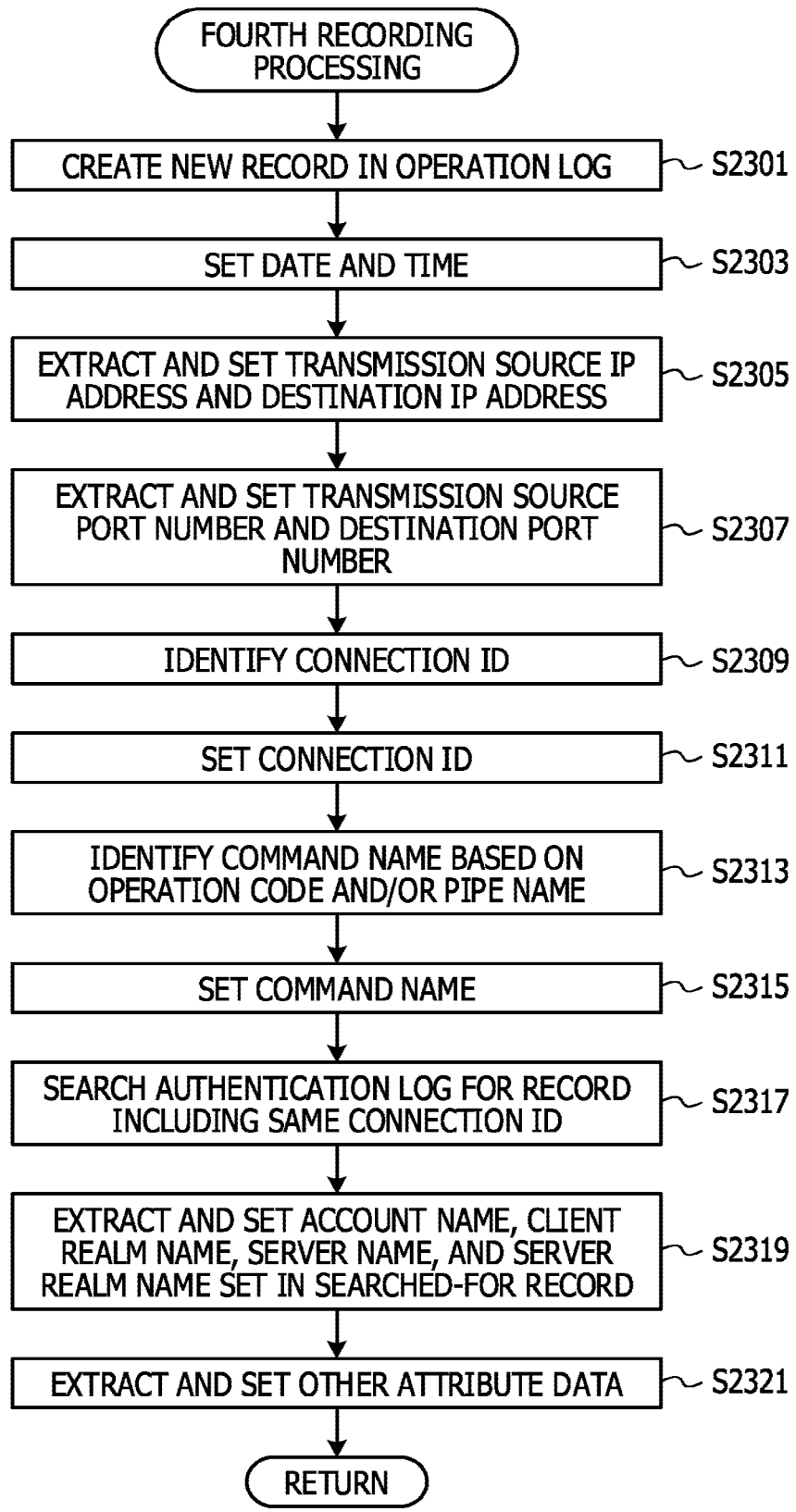
FIG. 23 is a diagram illustrating a flow of fourth recording processing.

Suppose that in an example of the fourth recording processing to be described later with reference to FIG. 23, other remote operation is established by one request message. However, some of the other remote operations are each established by a plurality of request messages as in the case of remote file access. In that case, as in the case of remote file access, the processing is divided into a plurality of pieces of processing. For example, a first request message and a second request message (there may be a case where a third request message is included or a case where a third request message and a subsequent request message (subsequent request messages) are included) are each assumed to be a request message of the corresponding other remote operation.

The following description will be made of an example of user registration. Before the fourth recording processing is described, description will be made of request messages of user registration and module configuration of the fourth recording processing unit 519.

Figure 21:
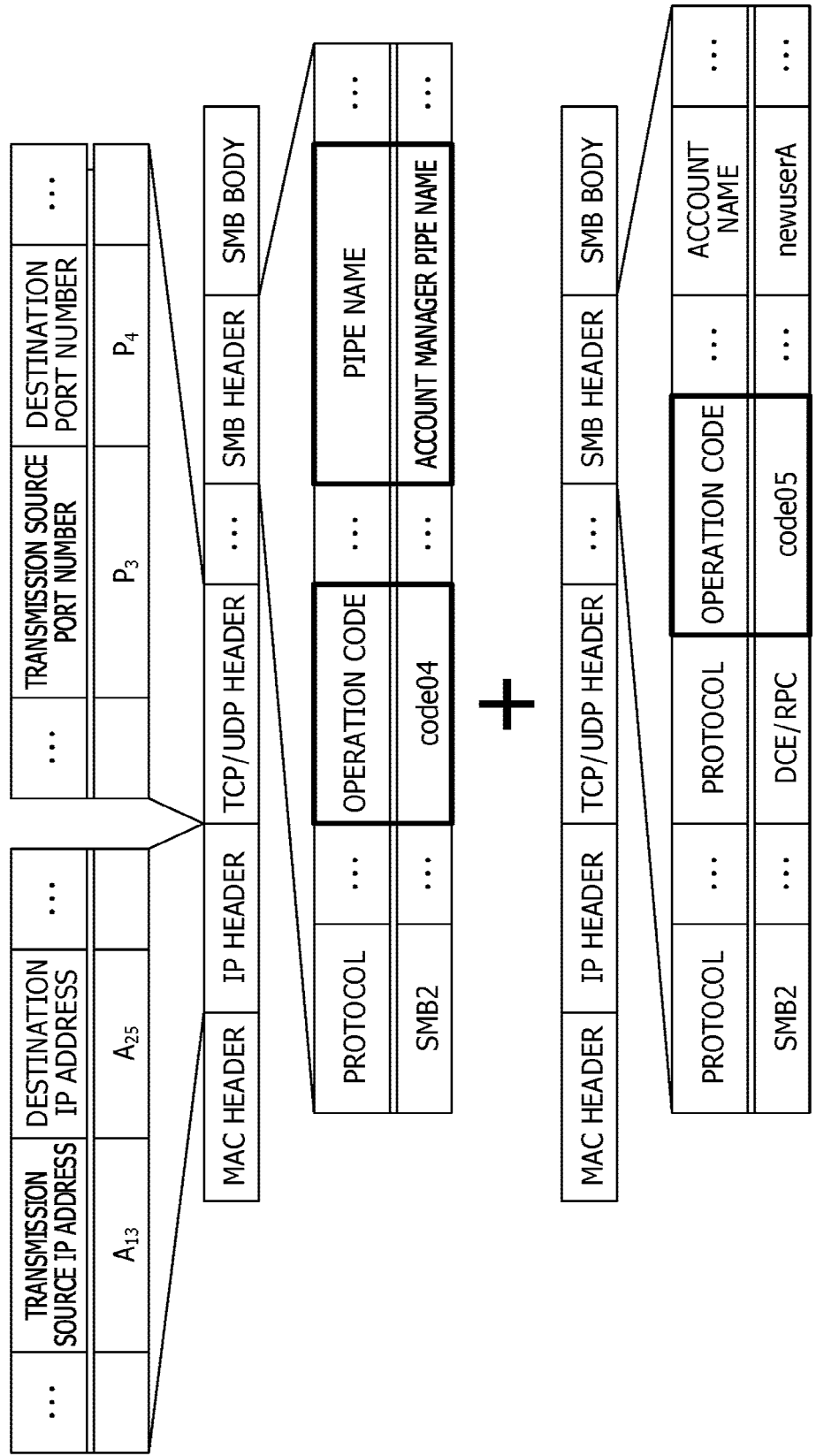
FIG. 21 is a diagram illustrating an example of a request message of user registration.

FIG. 21 illustrates an example of request messages of user registration. Suppose that a first request message in user registration which first request message is illustrated in an upper part of FIG. 21 is sent from a computer having an IP address "$A_{13}$" to a computer having an IP address "$A_{25}$." Hence, "$A_{13}$" is set in the field of a transmission source IP address, and "$A_{25}$" is set in the field of a destination IP address. Incidentally, a second request message in user registration which second request message is illustrated in a lower part of FIG. 21 is similar.

Suppose that a procedure for user registration in the present example is compliant with the version 2 of SMB. Hence, "SMB2" is set in the field of a protocol.

When an operation code set in the first request message is "code04," a pipe name set in the same packet is an "account manager pipe name," and an operation code set in the second request message (whose protocol, transmission source IP address, transmission source port number, destination IP address, and destination port number are the same as in the first request message) is "code05," it is determined that these request messages request user registration. Incidentally, an operation code in the case of the version 2 of SMB is 2 bytes. An account name is set in the second request message.

Figure 22:
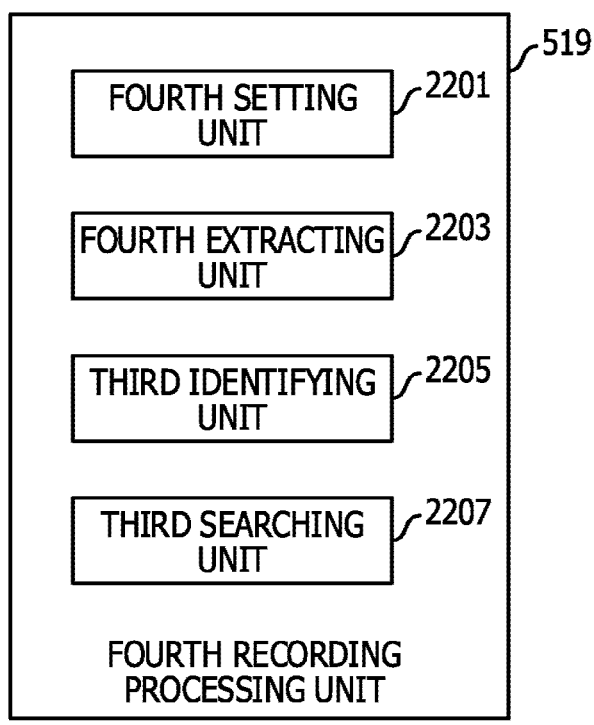
FIG. 22 is a diagram illustrating an example of module configuration of a fourth recording processing unit.

FIG. 22 illustrates an example of module configuration of a fourth recording processing unit. The fourth recording processing unit illustrated in FIG. 22 may be the fourth recording processing unit 519 illustrated in FIG. 5. The fourth recording processing unit 519 includes a fourth setting unit 2201, a fourth extracting unit 2203, a third identifying unit 2205, and a third searching unit 2207.

The fourth setting unit 2201 sets various kinds of data in a new record in the operation log. The fourth extracting unit 2203 extracts various kinds of data from the packet corresponding to a request message of remote operation other than remote file access. The third identifying unit 2205 identifies a command name. The third searching unit 2207 searches for a record including a specific connection ID in the authentication log.

The fourth setting unit 2201, the fourth extracting unit 2203, the third identifying unit 2205, and the third searching unit 2207 described above are implemented by using hardware resources (for example, FIG. 33) and a program for making a processor perform processing to be described in the following.

The fourth recording processing will next be described. FIG. 23 illustrates a flow of the fourth recording processing. The fourth recording processing unit 519 creates a new record in the operation log (S2301). The fourth setting unit 2201 sets the date and time of capture of the packet corresponding to a request message of remote operation other than remote file access in the new record (S2303).

The fourth extracting unit 2203 extracts a transmission source IP address and a destination IP address from the IP header of the packet, and the fourth setting unit 2201 sets the extracted transmission source IP address and the extracted destination IP address in the new record (S2305). Further, the fourth extracting unit 2203 extracts a transmission source port number and a destination port number from the UDP/TCP header of the packet, and the fourth setting unit 2201 sets the extracted transmission source port number and the extracted destination port number in the new record (S2307).

The first identifying unit 509 refers to the connection table, and identifies a connection ID corresponding to the combination of the transmission source IP address, the transmission source port number, the destination IP address, and the destination port number (S2309). The fourth setting unit 2201 sets the connection ID in the new record (S2311).

The third identifying unit 2205 identifies a command name based on an operation code and/or a service identifier (S2313). For example, according to a given rule, the third identifying unit 2205 identifies the command name (or a combination of the command name and an option) of the remote operation corresponding to a combination of the operation code and a pipe name (or either the operation code or the pipe name).

The fourth setting unit 2201 sets the identified command name (or the combination of the command name and the option) in the new record (S2315).

Incidentally, in a case where the command name (or the combination of the command name and the option) is identified by a first request message and a second request message (there may be a case where a third request message is included or a case where a third request message and a subsequent request message (subsequent request messages) are included), the command name (or the combination of the command name and the option) is identified in a stage in which processing is performed on the following request message, as in the case of the third recording processing.

The third searching unit 2207 searches the authentication log for a record including the same connection ID as the connection ID identified in the processing of S2309 (S2317).

The fourth extracting unit 2203 extracts an account name, a client realm name, a server name, and a server realm name set in the searched-for record, and the fourth setting unit 2201 sets the extracted account name, the extracted client realm name, the extracted server name, and the extracted server realm name in the new record in the operation log (S2319).

The fourth extracting unit 2203 extracts attribute data other than the account name according to a given rule corresponding to the command name (or the combination of the command name and the option) identified in S2313. Then, the fourth setting unit 2201 sets the extracted attribute data in the field of attribute data in the new record (S2321).

The fourth extracting unit 2203 may obtain the attribute data from the SMB body. In addition, when there is no attribute data to be extracted, the processing of S2321 may be omitted.

When attribute data to be extracted is included in a second request message (there may be a case where a third request message is included or a case where a third request message and a subsequent request message (subsequent request messages) are included), the processing of S2321 may be performed in a stage in which the processing is performed on the following request message.

Incidentally, when the following request message is also analyzed, the order of the request messages may be distinguished, and the processing may be performed according to the order of the request messages. When the fourth recording processing is ended, a return is made to the processing of S603 illustrated in FIG. 6 to repeat the above-described processing.

The description returns to FIG. 6. When it is determined in S623 that the packet specified in S603 does not correspond to a request message of other remote operation, the packet in question is considered not to correspond to an object for logging. Hence, a return is made directly to the processing illustrated in S603 to repeat the above-described processing.

In addition to the above-described main processing, the monitoring device 111 also performs processing of searching for an account name and makes a response in response to an inquiry from another monitoring device 111. This processing will be referred to as response processing.

Figure 24:
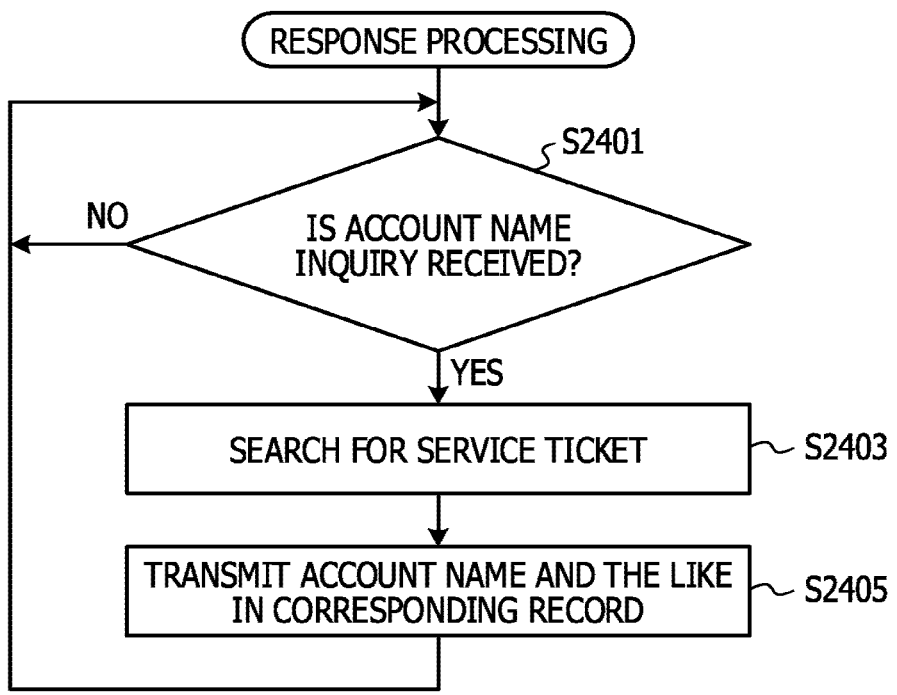
FIG. 24 is a diagram illustrating an example of a flow of response processing.

FIG. 24 illustrates an example of a flow of response processing. The first receiving unit 501 determines whether or not an account name inquiry is received (S2401). When it is determined that no account name inquiry is received, the processing of S2401 is repeated.

When it is determined that an account name inquiry is received, on the other hand, the first searching unit 523 searches the issuance log for a service ticket included in the account name inquiry (S2403). For example, the first searching unit 523 identifies the issuance log based on an issuance log file name included in the account name inquiry. At this time, the first searching unit 523 may identify the issuance log based on a given file name.

The first transmitting unit 503 transmits an account name, a client realm name, a server name, and a server realm name in a record identified as a result of the search to the monitoring device 111 as a transmission source of the account name inquiry (S2405). Then, a return is made to the processing illustrated in S2401 to repeat the above-described processing. This concludes the description of the operation of the monitoring device 111.

Figure 25:
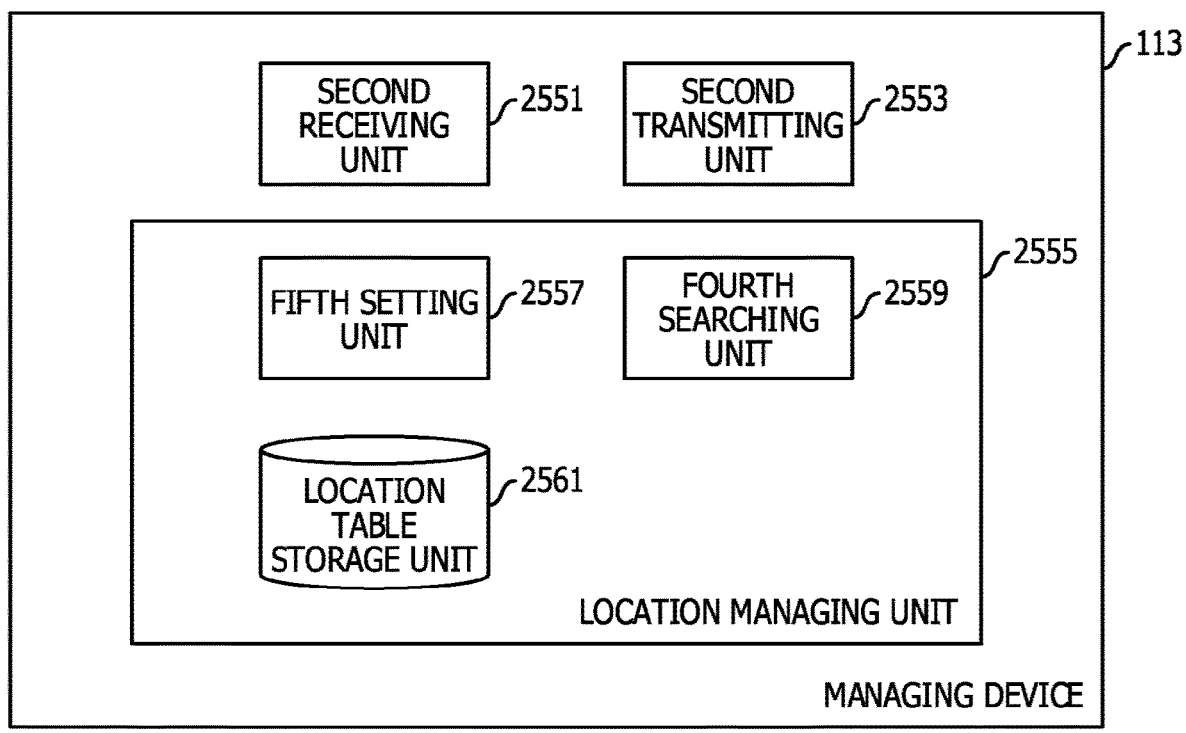
FIG. 25 is a diagram illustrating an example of module configuration of a managing device.

Operation of the managing device 113 will next be described. FIG. 25 illustrates an example of module configuration of the managing device 113. The managing device 113 includes a second receiving unit 2551, a second transmitting unit 2553, and a location managing unit 2555.

The second receiving unit 2551 receives various kinds of data. The second transmitting unit 2553 transmits various kinds of data. The location managing unit 2555 manages the locations of issuance records. The location managing unit 2555 includes a fifth setting unit 2557, a fourth searching unit 2559, and a location table storage unit 2561. The fifth setting unit 2557 sets various kinds of data in a record in the location table. The fourth searching unit 2559 searches the location table for a record matching a request source identifier and a service identifier included in a location inquiry. The location table storage unit 2561 stores the location table.

The second receiving unit 2551, the second transmitting unit 2553, the location managing unit 2555, the fifth setting unit 2557, the fourth searching unit 2559, and the location table storage unit 2561 described above are implemented by using hardware resources (for example, FIG. 33) and a program for making a processor perform processing to be described in the following.

FIG. 26 illustrates an example of configuration of a location table. The location table in the present example includes a record related to the location of an issuance record. The record includes a field for setting a date and time, a field for setting a request source IP address, a field for setting a request source port number, a field for setting a server realm name and a server name, a field for setting a monitoring device IP address, and a field for setting an issuance log file name.

The request source IP address identifies a device that requested the issuance of a service ticket. The request source port number identifies a port that sent out a request to issue the service ticket. The server realm name and the server name identify a device that provides a service for which the service ticket is used and a realm to which the device belongs. The monitoring device IP address identifies a monitoring device 111 that retains the issuance record. The issuance log file name identifies a file that retains the issuance record.

Figure 27A:
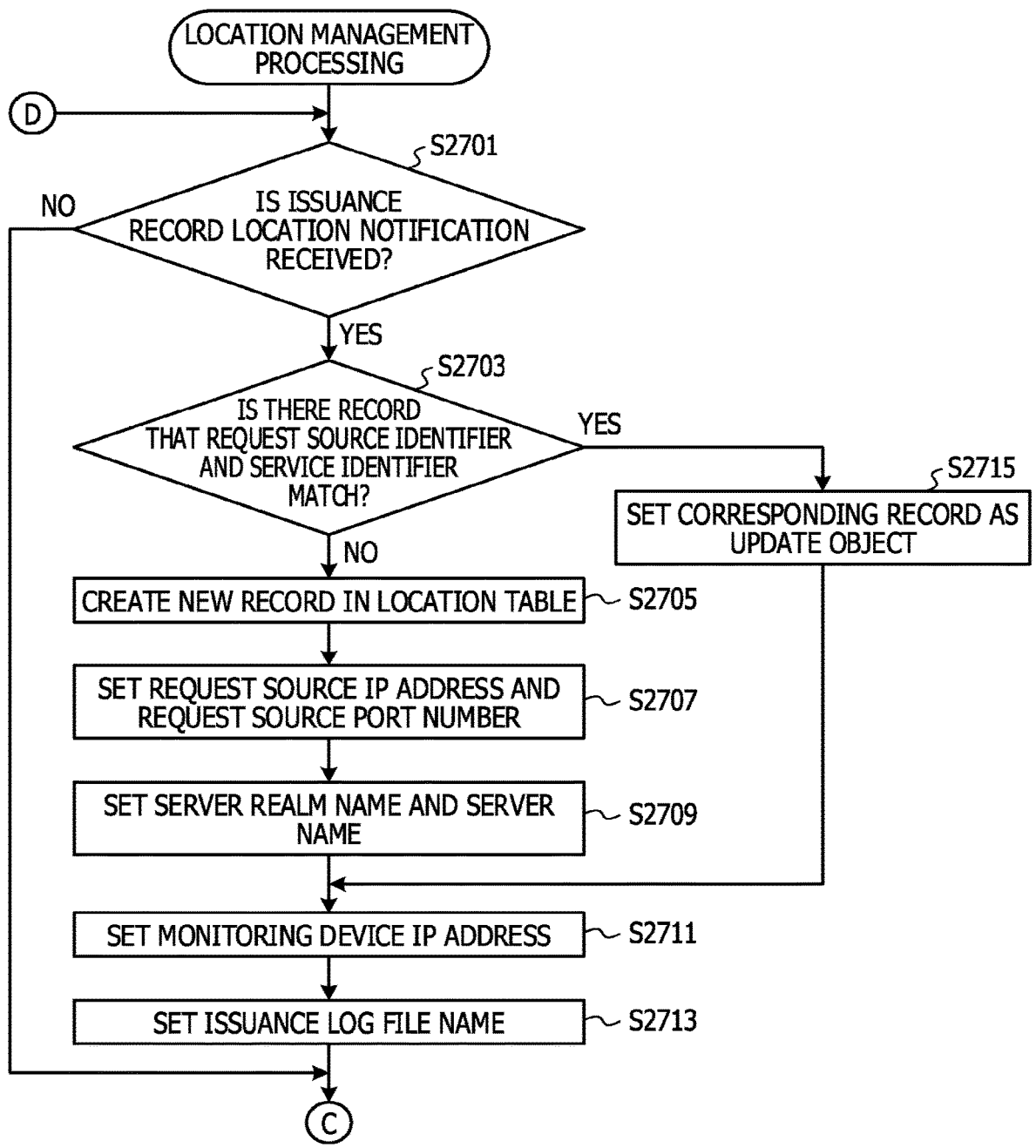
FIG. 27A is a diagram illustrating a flow of location management processing.
Figure 27B:
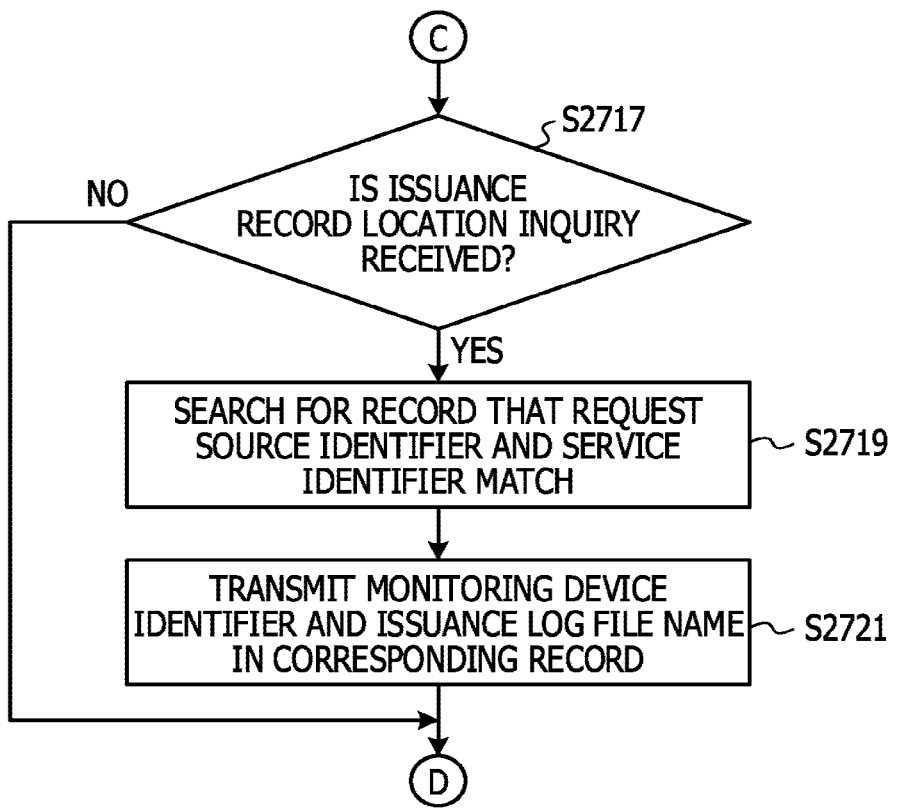
FIG. 27B is a diagram illustrating a flow of the location management processing.

FIG. 27A and FIG. 27B illustrate flows of location management processing. The flow illustrated in FIG. 27A corresponds to processing of receiving an issuance record location notification. First, the second receiving unit 2551 determines whether or not an issuance record location notification is received (S2701).

When it is determined that an issuance record location notification is received, the fifth setting unit 2557 determines whether or not the location table includes a record matching a request source identifier and a service identifier included in the issuance record location notification (S2703).

When determining that there is no record matching the request source identifier and the service identifier included in the issuance record location notification, the fifth setting unit 2557 creates a new record in the location table (S2705). Then, the fifth setting unit 2557 sets a request source IP address and a request source port number as the request source identifier in the new record (S2707). In addition, the fifth setting unit 2557 sets a server realm name and a server name as the service identifier in the new record (S2709).

Further, the fifth setting unit 2557 sets a monitoring device IP address included in the location notification in the new record (S2711). In addition, the fifth setting unit 2557 sets an issuance log file name included in the location notification in the new record (S2713). When the issuance log file name is uniquely determined, the processing of S2713 may be omitted. The flow then proceeds to processing of S2717 illustrated in FIG. 27B via a terminal C.

When the fifth setting unit 2557 determines in S2703 that there is a record matching the request source identifier and the service identifier included in the issuance record location notification, on the other hand, the fifth setting unit 2557 sets the record as an update object (S2715).

Then, the fifth setting unit 2557 sets a monitoring device IP address included in the location notification in the update object record (S2711). In addition, the fifth setting unit 2557 sets an issuance log file name included in the location notification in the update object record (S2713). When the issuance log file name is uniquely determined, the processing of S2713 may be omitted. The flow thereafter proceeds to the processing of S2717 illustrated in FIG. 27B via the terminal C. An increase in the number of records may be suppressed by thus overwriting the original record with new data when the key matches.

Also when it is determined in S2701 that no issuance record location notification is received, the flow proceeds to the processing of S2717 illustrated in FIG. 27B via the terminal C.

The description proceeds to FIG. 27B. The flow illustrated in FIG. 27B corresponds to processing of responding to an issuance record location inquiry. The second receiving unit 2551 determines whether or not an issuance record location inquiry is received (S2717).

When it is determined that an issuance record location inquiry is received, the fourth searching unit 2559 searches the location table for a record matching a request source identifier and a service identifier included in the location inquiry (S2719). For example, a set of the request source identifier and the service identifier corresponds to a key. The second transmitting unit 2553 transmits a monitoring device identifier and an issuance log file name set in a record identified as a result of the search to a monitoring device 111 as a transmission source of the location inquiry (S2721). The processing then returns to the processing illustrated in S2701 in FIG. 27A via a terminal D to repeat the above-described processing.

Also when it is determined in S2717 that no issuance record location inquiry is received, the processing returns to the processing illustrated in S2701 in FIG. 27A via the terminal D to repeat the above-described processing. This concludes the description of the operation of the managing device 113.

According to the present embodiment, it is possible to identify a user account that performed remote operation based on a service ticket issued from a ticket issuing server 109. For example, even in a mode in which the ticket issuing server 109 and a server computer 101 for which the service ticket is used belong to different networks, the user account that performed the remote operation on the server computer 101 may be identified. For example, the present embodiment is useful in identifying a user account over a wide area.

In addition, because the location of an issuance record is managed, a processing load of finding the user account corresponding to the service ticket from a plurality of monitoring devices 111 is lightened.

Second Embodiment

In the foregoing embodiment, description has been made of an example in which a request source identifier is a set of a request source IP address and a request source port number. However, the request source port number in the request source identifier may be omitted. For example, the request source identifier may be the request source IP address.

In the case of the present embodiment, the request source identifier included in the location notification transmitted in S405 in FIG. 4A is the request source IP address. Similarly, the request source identifier included in the location inquiry transmitted in S413 in FIG. 4B is the request source IP address.

Hence, in S609 in FIG. 6, the request source IP address is included as the request source identifier in the issuance record location notification. Then, in S611 in FIG. 6, the issuance record location notification including the request source IP address as the request source identifier is transmitted.

In addition, in S1303 in FIG. 13A, the request source IP address is extracted as the request source identifier. In S1305 in FIG. 13A, the issuance record location inquiry including the request source IP address as the request source identifier is transmitted.

In this case, the field for setting the request source port number may be omitted in records in the location table illustrated in FIG. 26.

In S2703 in FIG. 27A, the fifth setting unit 2557 extracts the request source IP address as the request source identifier from the issuance record location notification. The fifth setting unit 2557 then determines whether or not the location table includes a record matching the request source IP address and the service identifier. In addition, in S2707 in FIG. 27A, the request source IP address is set, and the setting of the request source port number is omitted.

In S2719 in FIG. 27B, the fourth searching unit 2559 extracts the request source IP address as the request source identifier from the issuance record location inquiry. The fourth searching unit 2559 then searches the location table for a record matching the extracted request source IP address and the service identifier.

According to the present embodiment, the number of records in the location table is decreased, and therefore the processing of searching the location table becomes faster.

Third Embodiment

In the foregoing embodiment, description has been made of an example in which the location of an issuance record is managed with a set of a request source identifier and a service identifier as a key. However, an issuance source identifier may be added to the key. In the present embodiment, description will be made of an example in which the location of an issuance record is managed with a set of an issuance source identifier, a request source identifier, and a service identifier as a key.

The issuance source identifier is data that identifies a ticket issuing server 109 as an issuance source of a service ticket. The issuance source identifier may be a host name, for example, or may be an IP address or a MAC address. The present embodiment may be based on either of the first embodiment or the second embodiment. For example, the request source identifier may be a set of a request source IP address and a request source port number, or may be the request source IP address.

Figure 28A:
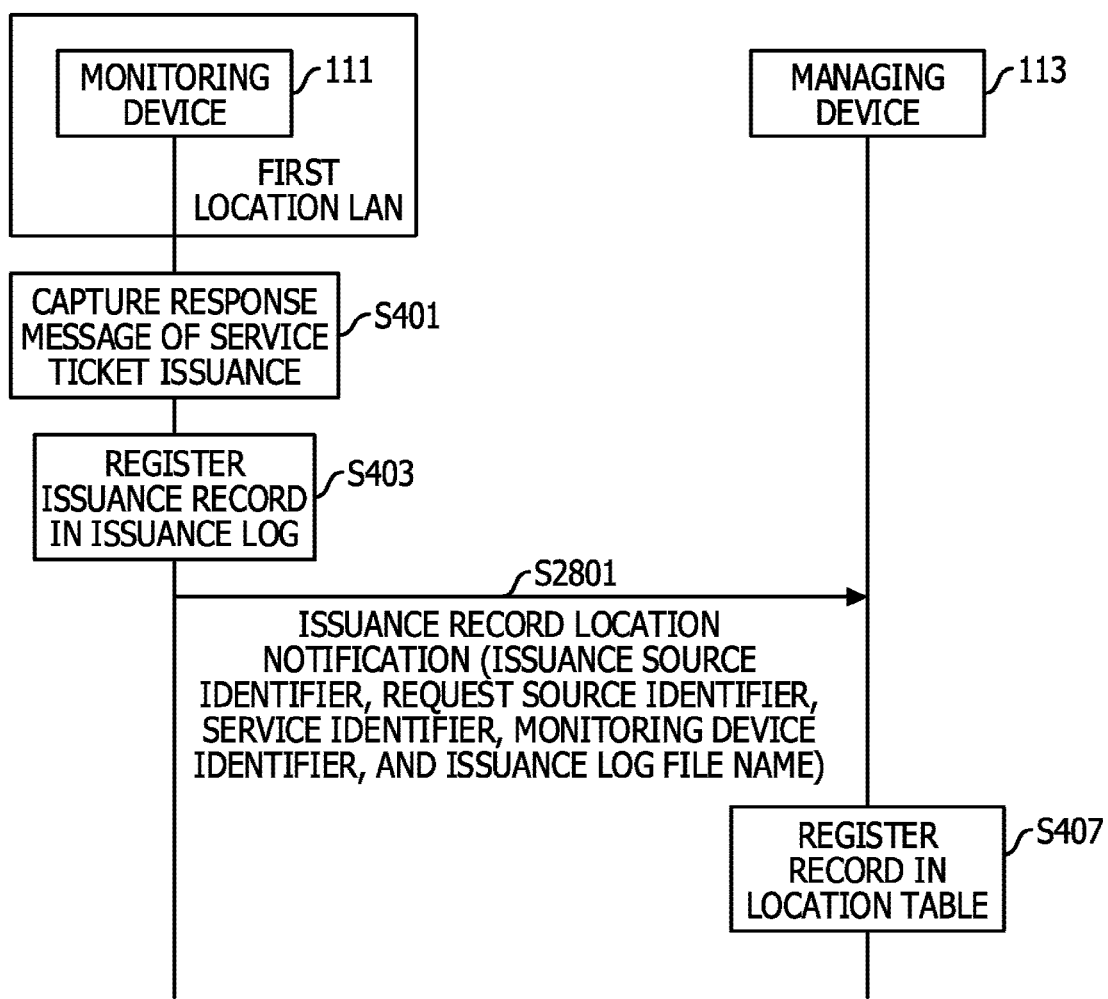
FIG. 28A is a diagram illustrating an example of a sequence of a network monitoring system according to a third embodiment.
Figure 28B:
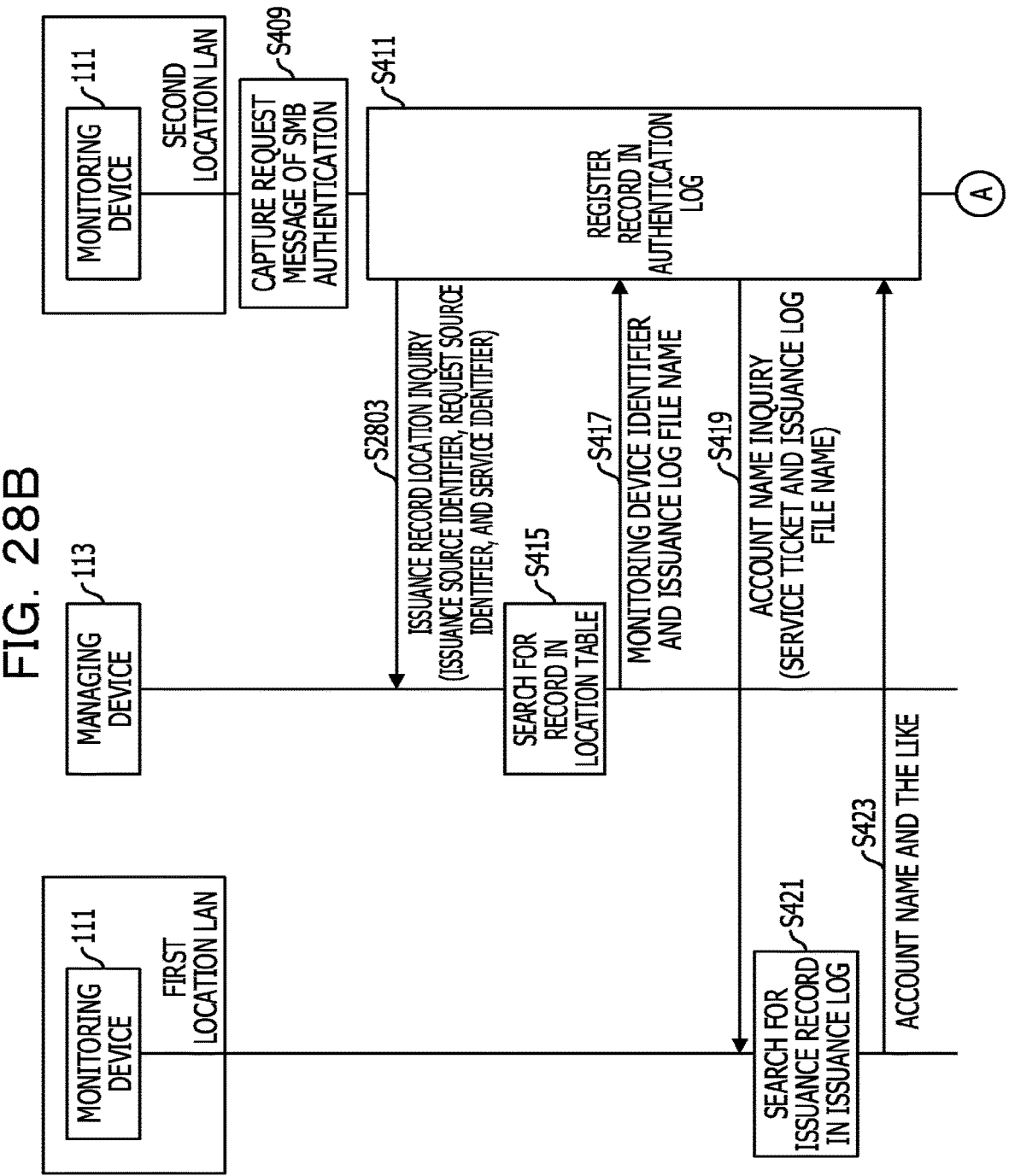
FIG. 28B is a diagram illustrating an example of a sequence of the network monitoring system according to the third embodiment.

FIG. 28A and FIG. 28B illustrate an example of a sequence of a network monitoring system according to the third embodiment. Steps of S401 and S403 are similar to the steps of FIG. 4A.

In the present embodiment, a location notification transmitted in S2801 includes an issuance source identifier, a request source identifier, a service identifier, a monitoring device identifier, and an issuance log file name.

Then, in S407, the managing device 113 registers a record in the location table with the issuance source identifier, the request source identifier, and the service identifier as a key.

The description proceeds to FIG. 28B. Step of S409 is similar to the step of FIG. 4B.

A location inquiry transmitted in S2803 includes the issuance source identifier, the request source identifier, and the service identifier.

Then, in S415, the managing device 113 searches the location table for a record in which the issuance source identifier, the request source identifier, and the service identifier included in the location inquiry are set. Incidentally, steps of S417 to S423 are similar to the steps of FIG. 4B. In addition, a subsequent sequence is similar to the sequence of the first embodiment (FIG. 4C).

FIG. 29 illustrates an example of configuration of a location table according to the third embodiment. A record in the location table according to the third embodiment has a field for setting an issuance source identifier in addition to the fields included in records in the location table illustrated in FIG. 26.

Figure 30:
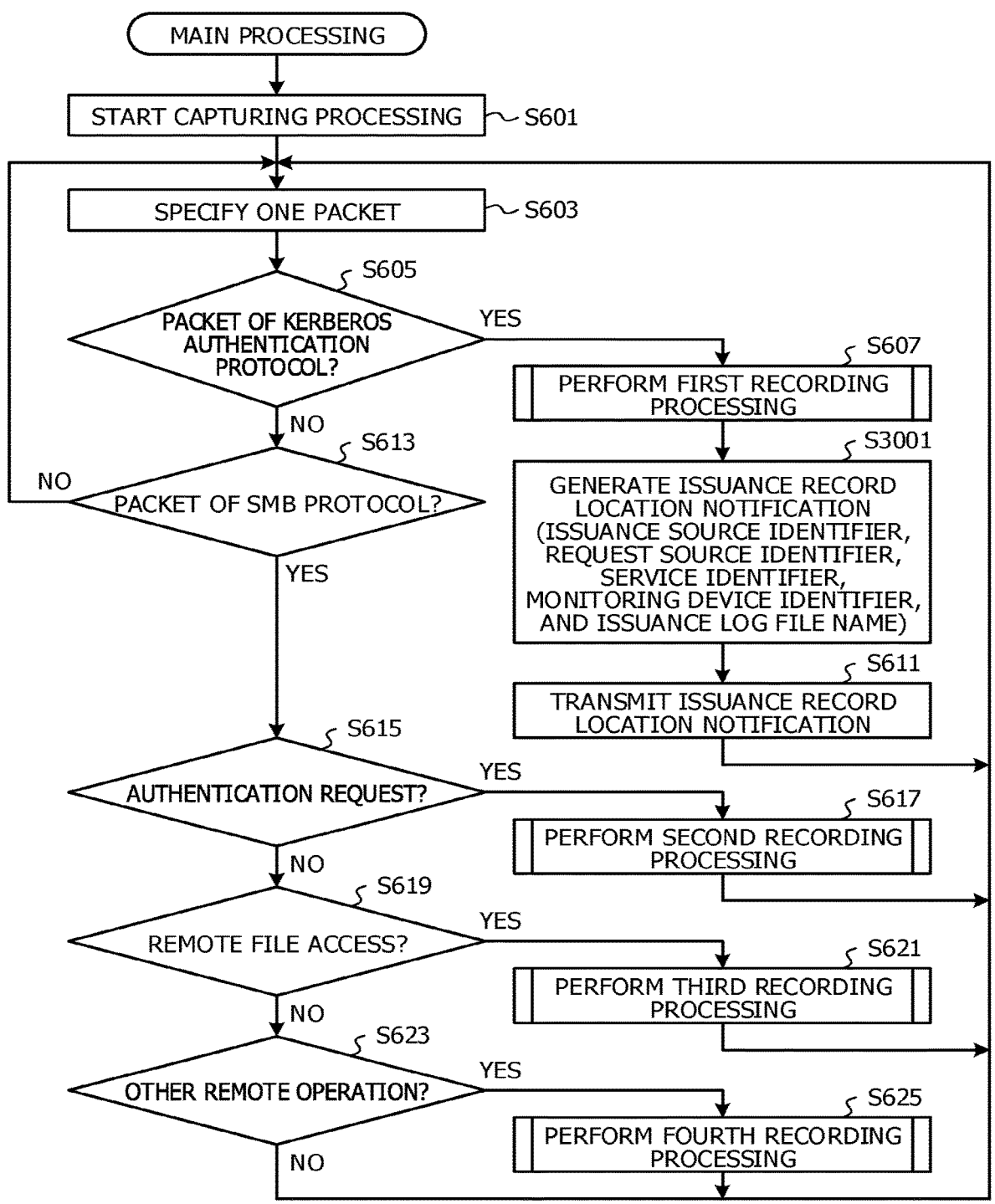
FIG. 30 is a diagram illustrating a flow of main processing of a monitoring device according to the third embodiment.

FIG. 30 illustrates a flow of main processing of a monitoring device according to the third embodiment. The monitoring device illustrated in FIG. 30 may be the monitoring device 111 illustrated in FIG. 28A. The processing of S601 to S607 is similar to the processing of the first embodiment (FIG. 6).

An issuance record location notification generated in S3001 includes an issuance source identifier, a request source identifier, a service identifier, a monitoring device identifier, and an issuance log file name.

In S611, the location notification including the issuance source identifier, the request source identifier, the service identifier, the monitoring device identifier, and the issuance log file name is transmitted. In addition, second recording processing illustrated in the following is performed in S617.

FIG. 31 illustrates a flow of second recording processing according to the third embodiment. The processing of S1301 is similar to the processing of the first embodiment (FIG. 13A).

In S3101, the second extracting unit 1203 extracts an issuance source identifier, a request source identifier, and a service identifier.

In S1305, the first transmitting unit 503 transmits an issuance record location inquiry (including the issuance source identifier, the request source identifier, and the service identifier) to the managing device 113.

Processing from S1307 on down is similar to the processing of the first embodiment (FIG. 13A and FIG. 13B).

Other processing illustrated in FIG. 30 is similar to the processing of the first embodiment (FIG. 6).

Figure 32A:
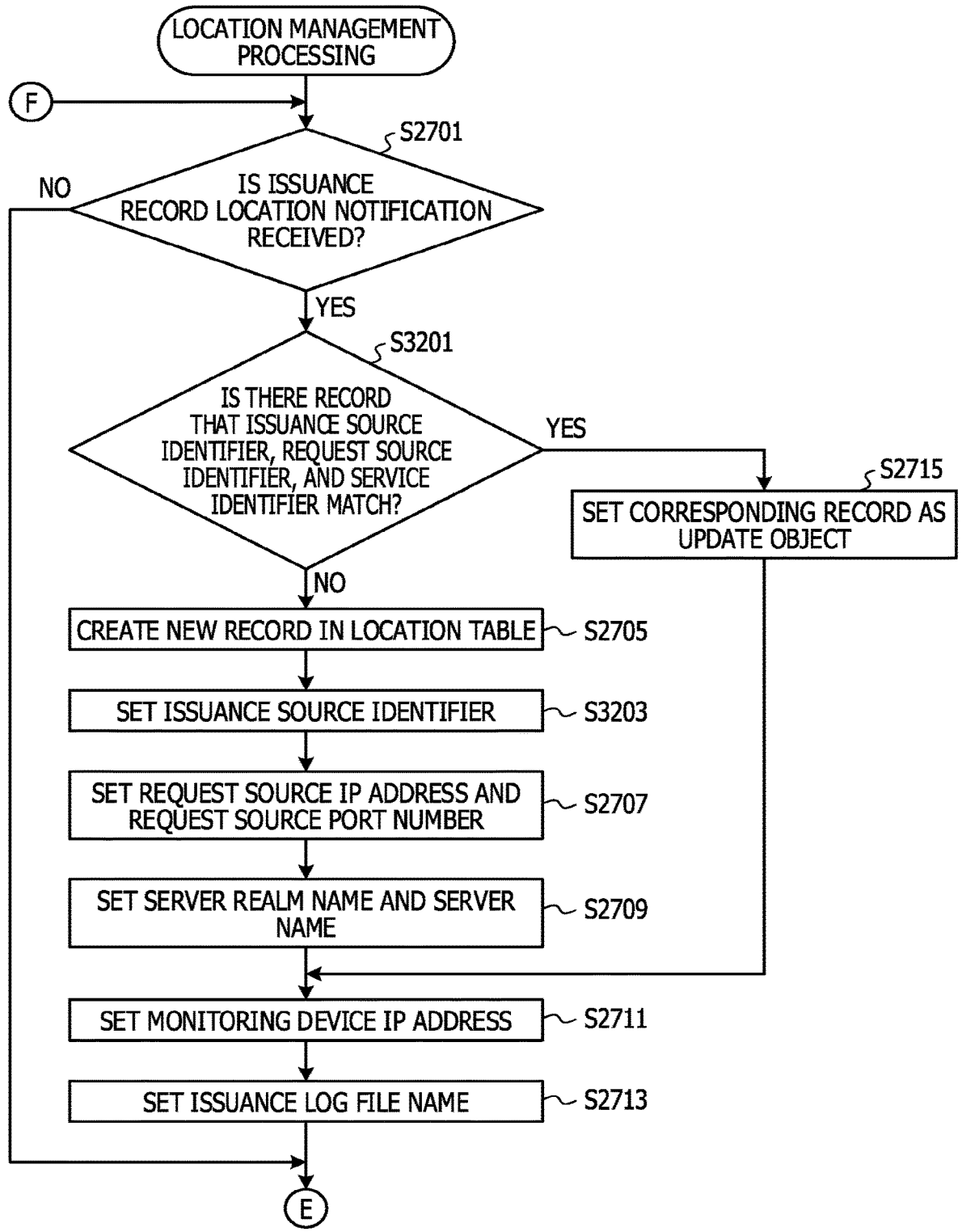
FIG. 32A is a diagram illustrating a flow of location management processing according to the third embodiment.
Figure 32B:
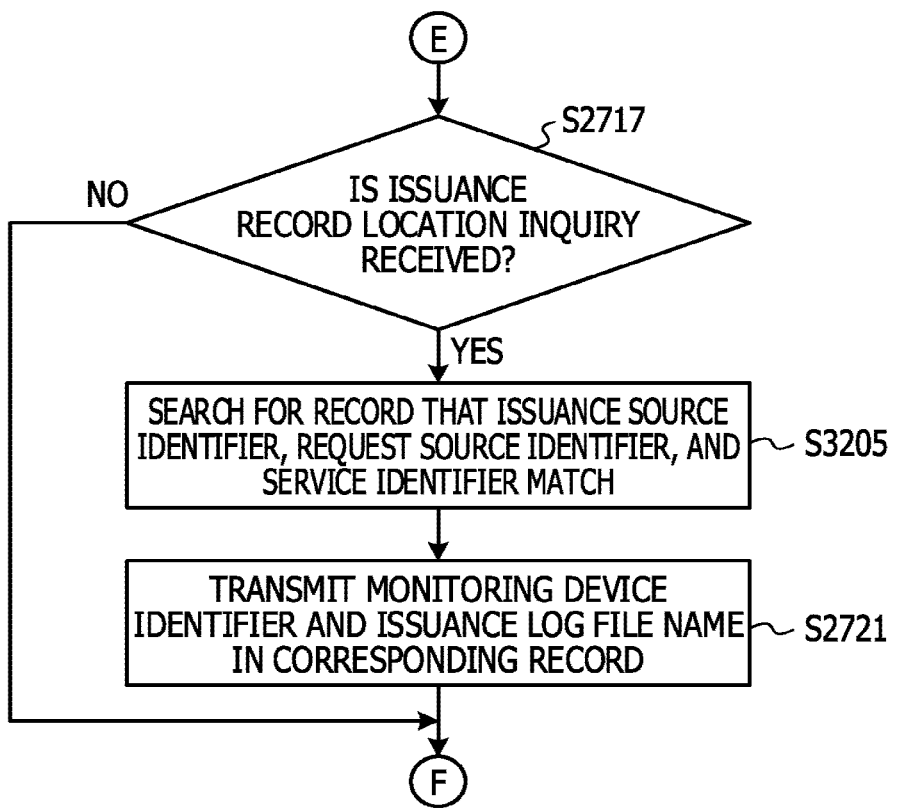
FIG. 32B is a diagram illustrating a flow of the location management processing according to the third embodiment.

FIG. 32A and FIG. 32B illustrate flows of location management processing according to the third embodiment. Processing of S2701 is similar to the processing of the first embodiment (FIG. 27A).

In S3201, the fifth setting unit 2557 extracts an issuance source identifier, a request source identifier, and a service identifier from an issuance record location notification, and determines whether or not there is a record matching the issuance source identifier, the request source identifier, and the service identifier.

When it is determined that there is no record matching the issuance source identifier, the request source identifier, and the service identifier, the flow proceeds to processing of S2705. The processing of S2705 is similar to the processing of the first embodiment (FIG. 27A). When it is determined that there is a record matching the issuance source identifier, the request source identifier, and the service identifier, on the other hand, the flow proceeds to processing of S2715. The processing of S2715 is similar to the processing of the first embodiment (FIG. 27A).

Following the processing of S2705, the fifth setting unit 2557 sets the issuance source identifier extracted from the issuance record location notification in the new record (S3203).

Processing of S2707 to S2713 is similar to the processing of the first embodiment (FIG. 27A). The flow proceeds to processing of S2717 illustrated in FIG. 32B via a terminal E.

The processing of S2717 illustrated in FIG. 32B is similar to the processing of the first embodiment (FIG. 27B).

When it is determined in S2717 that an issuance record location inquiry is received, the fourth searching unit 2559 searches the location table for a record matching an issuance source identifier, a request source identifier, and a service identifier included in the location inquiry (S3205).

Processing of S2721 illustrated in FIG. 32B is similar to the case of the first embodiment (FIG. 27B). The flow then proceeds to the processing of S2701 illustrated in FIG. 32A via a terminal F.

When it is determined in S2717 that no issuance record location inquiry is received, on the other hand, the flow proceeds directly to the processing of S2701 illustrated in FIG. 32A via the terminal F.

According to the present embodiment, even in a case where a request to issue a service ticket is made from a client computer 103 as one request source to a plurality of ticket issuing servers 109, for example, a monitoring device 111 of which to inquire about a user account may be identified more correctly.

Embodiments of the present technology have been described above. However, the present technology is not limited to these embodiments. For example, the functional block configurations described above may not coincide with program module configurations.

In addition, the configurations of the respective storage areas described above are an example, and do not need to be the configurations as described above. Further, also in the processing flows, the processing order may be interchanged or a plurality of pieces of processing may be performed in parallel with each other unless processing results are changed.

Incidentally, the monitoring devices 111 and the managing device 113 described above are each a computer device. FIG. 33 is a functional block diagram of a computer. As illustrated in FIG. 33, the computer device includes a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for coupling to a network. The memory 2501, the CPU 2503, the HDD 2505, the display control unit 2507, the drive device 2513, the input device 2515, and the communication control unit 2517 are coupled to each other by a bus 2519. An operating system (OS) and an application program for performing the processing in the present embodiments are stored on the HDD 2505, and are read from the HDD 2505 into the memory 2501 when executed by the CPU 2503. The CPU 2503 controls the display control unit 2507, the communication control unit 2517, and the drive device 2513 to make the display control unit 2507, the communication control unit 2517, and the drive device 2513 perform given operation according to processing contents of the application program. In addition, data being processed is stored mainly in the memory 2501, but may be stored on the HDD 2505. In an embodiment of the present technology, the application program for performing the processing described above is distributed in a state of being stored on the computer readable removable disk 2511, and is installed from the drive device 2513 onto the HDD 2505. The application program may be installed onto the HDD 2505 via the network and the communication control unit 2517. Such a computer device implements various kinds of functions as described above when hardware such as the CPU 2503, the memory 2501, and the like described above and programs such as the OS and the application program or the like cooperate with each other organically.

The embodiments of the present technology described above are summarized as follows.

A network monitoring system according to the present embodiments includes a first monitoring device and a second monitoring device. The first monitoring device includes: (A) a first recording processing unit configured to record a credential and a user account of the credential in association with each other, the credential and the user account being extracted from first communication data of a credential issuing device. The second monitoring device includes: (B) an obtaining unit configured to obtain, from the first monitoring device, the user account corresponding to the credential extracted from second communication data related to an authentication request to a service providing device that responds to remote operation; and (C) a second recording processing unit configured to record remote operation data in association with the obtained user account, the remote operation data being extracted from third communication data sent from a same transmission source as a transmission source of the second communication data to the above-described service providing device.

Thus, it is possible to identify the user account that performed remote operation based on the credential issued from the credential issuing device. For example, even in a mode in which the credential issuing device and the service providing device belong to different networks, the user account that performed remote operation on the service providing device may be identified.

In addition, the network monitoring system may include a plurality of first monitoring devices, and further include a managing device. Each of the plurality of first monitoring devices may include a notifying unit configured to notify the managing device of request source identifying data and service identifying data identifying a credential application object, the request source identifying data and the service identifying data being extracted from first communication data, together with device identifying data of the first monitoring device itself. The managing device may include a storage unit configured to store the notified request source identifying data, the notified service identifying data, and the notified device identifying data in association with each other. The above-described obtaining unit may obtain, from the managing device, device identifying data corresponding to request source identifying data and service identifying data extracted from the second communication data, and identify a first monitoring device as a destination of a user account inquiry based on the obtained device identifying data.

Thus, a processing load of finding the user account corresponding to the credential from the plurality of first monitoring devices is lightened.

In addition, the network monitoring system may include a plurality of first monitoring devices, and further include a managing device. Each of the plurality of first monitoring devices may include a notifying unit configured to notify the managing device of credential issuance source identifying data, request source identifying data, and service identifying data identifying a credential application object, the credential issuance source identifying data, the request source identifying data, and the service identifying data being extracted from first communication data, together with device identifying data of the first monitoring device itself. The managing device may include a storage unit configured to store the notified credential issuance source identifying data, the notified request source identifying data, the notified service identifying data, and the notified device identifying data in association with each other. The above-described obtaining unit may obtain, from the managing device, device identifying data corresponding to credential issuance source identifying data, request source identifying data, and service identifying data extracted from the second communication data, and identify a first monitoring device as a destination of a user account inquiry based on the obtained device identifying data.

Thus, even in a case where a request to issue a credential is made from one request source to a plurality of credential issuing devices, for example, the second monitoring device may more correctly identify a first monitoring device of which to inquire about the user account.

A network monitoring device according to the present embodiments includes: (D) a first recording processing unit configured to record a credential and a user account of the credential in association with each other, the credential and the user account being extracted from first communication data of a credential issuing device; (E) an obtaining unit configured to obtain, from another network monitoring device, a user account corresponding to a credential extracted from second communication data related to an authentication request to a service providing device that responds to remote operation; and (F) a second recording processing unit configured to record remote operation data in association with the obtained user account, the remote operation data being extracted from third communication data sent from a same transmission source as a transmission source of the second communication data to the above-described service providing device.

Incidentally, a program for making a computer perform the processing of the first monitoring device, the second monitoring device, and the network monitoring device described above may be created, and the program may be stored by a computer readable storage medium or a storage device such as a flexible disk, a compact disc read-only memory (CD-ROM), a magneto-optical disk, a semiconductor memory, a hard disk, or the like. Incidentally, intermediate processing results are stored temporarily in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
one or more devices, wherein the one or more devices including a first device, wherein the first device includes a first memory and a first processor; and
a second device including a second memory and a second processor,
wherein the first processor is configured to:
extract a credential from first communication data transmitted between a terminal device and an issuing device which issues the credential to the terminal device, and
store the credential and a user account of the credential in association with each other in the first memory, and
the second processor is configured to:
obtain, from the first device, the user account corresponding to the credential extracted from a second communication data, the second communication data corresponding to an authentication request including the credential issued by the issuing device from the terminal device to a providing device which is configured to authorize the terminal device based on the credential included in the authentication request and to process a remote operation by the authorized terminal device, and
record remote operation data extracted from third communication data transmitted from the authorized terminal device to the providing device in association with the obtained user account in the second memory,
wherein the terminal device sends a request message to an authentication device, wherein the request message includes authentication information,
in response to successfully verifying the authentication information by the authentication device, the terminal device receives from the authentication device a ticket-granting ticket,
wherein the terminal device sends a second request message that includes the ticket-granting ticket to the issuing device,
wherein the issuing device issues a service ticket to the terminal device in response to successfully verifying contents of the ticket-granting ticket in the second request message, and
wherein the terminal device sends the authentication request and the service ticket to the providing device, wherein the providing device enables the terminal device to process a remote operation when successfully verifying the service ticket.

2. The system according to claim 1, wherein the one or more devices are a plurality of devices.

3. The system according to claim 2, further comprising:
a manager including a third memory and a third processor, wherein the third processor is configured to communicate with each of the plurality of devices and the second device.

4. The system according to claim 3, wherein
the first processor is configured to transmit request source identifying data, service identifying data, and device identifying data which are identified based on the first communication data to the manager,
the request source identifying data indicates the terminal device which requests the issuing device to issue the credential,
the service identifying data indicates an object to which the terminal device applies the credential, and
the device identifying data indicates the first device which stores the user account.

5. The system according to claim 4, wherein
the third processor in the manager is configured to store the request source identifying data, the service identifying data, and the device identifying data in association with each other in the third memory.

6. The system according to claim 5, wherein
the second processor in the second device is configured to:
identify, from the second communication, the request source identifying and first service identifying data,
obtain, from the manager, the device identifying data associated with corresponding to the identified request source identifying data and the identified service identifying data extracted from the second communication data, and
identify the first device, from among the plurality of first devices, as a location of the user account destination of a user account inquiry based on the obtained device identifying data.

7. The system according to claim 3, wherein
the first processor is configured to transmit credential issuance source identifying data, request source identifying data, service identifying data, and device identifying data which are identified based on the first communication data to the manager, the credential issuance source indicates the issuing device which issues the credential to the terminal device, the request source identifying data indicates the terminal device which requests the issuing device to issue the credential, the service identifying data indicates an object to which the terminal device applies the credential, and the device identifying data indicates the first device which stores the user account.

8. The system according to claim 7, wherein the third processor in the manager is configured to store the credential issuance source identifying data, the request source identifying data, the service identifying data, and the device identifying data in association with each other in the third memory.

9. The system according to claim 8, wherein the second processor in the second device is configured to:

identify, from the second communication, the credential issuance source identifying data, the request source identifying and first service identifying data, obtain, from the manager, the device identifying data associated with the identified credential issuance source identifying data, the identified request source identifying data, and the identified service identifying data, and identify the first device, from among the plurality of devices, as a location of the user account based on the obtained device identifying data.

10. A non-transitory computer-readable storage medium storing a program which causes a computer to execute a process, the process comprising:

obtaining, from another computer storing a user account in association with a credential which is issued to a terminal device by an issuing device, the user account associated with the credential extracted from first communication data corresponding to an authentication request including the credential issued by the issuing device from the terminal device to a providing device which is configured to authorize the terminal device based on the credential included in the authentication request and to process a remote operation by the authorized terminal device; and recording remote operation data extracted from second communication data from the authorized terminal device to the providing device in association with the obtained user account in a memory, wherein the terminal device sends a request message to an authentication device, wherein the request message includes authentication information, in response to successfully verifying the authentication information by the authentication device, the terminal device receives from the authentication device a ticket-granting ticket, wherein the terminal device sends a second request message that includes the ticket-granting ticket to the issuing device, wherein the issuing device issues a service ticket to the terminal device in response to successfully verifying contents of the ticket-granting ticket in the second request message, and wherein the terminal device sends the authentication request and the service ticket to the providing device, wherein the providing device enables the terminal device to process a remote operation when successfully verifying the service ticket.

11. A method executed by a computer, the method comprising:

obtaining, from another computer storing a user account in association with a credential which is issued to a terminal device by an issuing device, the user account associated with the credential extracted from first communication data corresponding to an authentication request including the credential issued by the issuing device from the terminal device to a providing device which is configured to authorize the terminal device based on the credential included in the authentication request and to process a remote operation by the authorized terminal device; and recording remote operation data extracted from second communication data from the authorized terminal device to the providing device in association with the obtained user account in a memory, wherein the terminal device sends a request message to an authentication device, wherein the request message includes authentication information, in response to successfully verifying the authentication information by the authentication device, the terminal device receives from the authentication device a ticket-granting ticket, wherein the terminal device sends a second request message that includes the ticket-granting ticket to the issuing device, wherein the issuing device issues a service ticket to the terminal device in response to successfully verifying contents of the ticket-granting ticket in the second request message, and wherein the terminal device sends the authentication request and the service ticket to the providing device, wherein the providing device enables the terminal device to process a remote operation when successfully verifying the service ticket.

\* \* \* \* \*